United States Patent
De La Cruz Garcia et al.

(10) Patent No.: US 9,828,912 B2
(45) Date of Patent: Nov. 28, 2017

(54) COMBINED CYCLE POWER PLANT WITH FLUE GAS RECIRCULATION

(75) Inventors: Marta De La Cruz Garcia, Zürich (CH); Thierry Lachaux, Birr (CH); Andre Burdet, Savigny (CH); Jaan Hellat, Baden-Rütihof (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 1099 days.

(21) Appl. No.: 13/116,486

(22) Filed: May 26, 2011

(65) Prior Publication Data

US 2011/0289899 A1 Dec. 1, 2011

(30) Foreign Application Priority Data

May 26, 2010 (CH) .......................................... 841/10
Nov. 17, 2010 (CH) ..................................... 01925/10

(51) Int. Cl.
*F02C 3/34* (2006.01)
*F01K 17/04* (2006.01)
(Continued)

(52) U.S. Cl.
CPC ................ *F02C 3/34* (2013.01); *F01K 17/04* (2013.01); *F01K 23/10* (2013.01); *F02C 3/28* (2013.01);
(Continued)

(58) Field of Classification Search
CPC ...... F02C 3/34; F02C 1/08; F02C 9/42; F02C 6/02; F02C 6/003; F02C 7/08; F02C 3/28;
(Continued)

(56) References Cited

U.S. PATENT DOCUMENTS 3,546,882 A * 12/1970 Berkey ........................... 60/204
3,703,807 A 11/1972 Rice
(Continued)

FOREIGN PATENT DOCUMENTS

DE 2731387 1/1978
EP 0620363 A1 10/1994
(Continued)

OTHER PUBLICATIONS

Search Report dated Nov. 28, 2011, issued in the corresponding German Patent Application No. 10 2011 102 721.5. (5 pages).
(Continued)

*Primary Examiner* — Ted Kim
(74) *Attorney, Agent, or Firm* — Buchanan Ingersoll & Rooney PC

(57) ABSTRACT

An exemplary method for the operation of a CCPP with flue gas recirculation to reduce NOx emissions and/or to increase the CO2 concentration in the flue gases to facilitate CO2 capture from the flue gases as well as a plant designed to operate is disclosed. To allow a high flue gas recirculation ration (rFRG) an imposed combustion inhomogeneity ratio (ri) is used for flame stabilization. The imposed combustion inhomogeneity ratio (ri) is controlled as function of the flue gas recirculation rate (rFRG) and/or combustion pressure. Oxygen or oxygen enriched air to the gas turbine inlet gases or to the combustor is admixed to enhance operatability.

20 Claims, 10 Drawing Sheets

(51) Int. Cl.
*F01K 23/10* (2006.01)
*F02C 3/28* (2006.01)
*F02C 6/00* (2006.01)
*F02C 9/24* (2006.01)

(52) U.S. Cl.
CPC ............... *F02C 6/003* (2013.01); *F02C 9/24* (2013.01); *Y02E 20/16* (2013.01); *Y02E 20/326* (2013.01)

(58) Field of Classification Search
CPC ...... F02C 5/02; F02C 5/12; F02C 6/18; F02C 9/24; F01K 23/10; F01K 17/04; F01K 23/106; F01D 25/30; F02K 1/825; F02K 7/06; Y02E 20/16; Y02E 20/18; Y02T 50/671; Y02T 50/675; F23C 7/002; F23C 2900/07002; F23R 3/286; F23D 17/002; F23D 2900/14021; B01J 3/08; B05B 7/0006
USPC ......... 60/39.52, 39.5, 39.182, 39.15, 39.181, 60/39.17
See application file for complete search history.

(56) References Cited

U.S. PATENT DOCUMENTS

| | | | |
|---|---|---|---|
| 3,785,145 A | | 1/1974 | Amann |
| 4,441,435 A | * | 4/1984 | Miyamoto ............... 110/245 |
| 5,235,814 A | * | 8/1993 | Leonard .................. 60/738 |
| 5,634,327 A | | 6/1997 | Kamber et al. |
| 6,173,562 B1 | | 1/2001 | Utamura et al. |
| 6,202,400 B1 | | 3/2001 | Utamura et al. |
| 6,256,976 B1 | | 7/2001 | Kataoka et al. |
| 6,269,624 B1 | | 8/2001 | Frutschi et al. |
| 6,430,914 B1 | * | 8/2002 | Goidich et al. ............. 60/781 |
| 6,529,849 B2 | * | 3/2003 | Umezawa et al. ........... 702/136 |
| 6,598,402 B2 | | 7/2003 | Kataoka et al. |
| 6,622,470 B2 | | 9/2003 | Viteri et al. |
| 6,769,903 B2 | * | 8/2004 | Eroglu et al. ............. 431/8 |
| 6,945,029 B2 | | 9/2005 | Viteri |
| 7,007,487 B2 | * | 3/2006 | Belokon et al. ............. 60/777 |
| 7,036,317 B2 | * | 5/2006 | Tanaka et al. .............. 60/773 |
| 7,093,443 B2 | * | 8/2006 | McKelvey ............ F01D 15/10 60/39.281 |
| 7,107,772 B2 | * | 9/2006 | Chen ................ F23N 1/002 60/737 |
| 7,191,587 B2 | | 3/2007 | Marin et al. |
| 7,293,415 B2 | * | 11/2007 | Hoffmann ............. F02C 7/057 60/39.27 |
| 7,484,352 B2 | | 2/2009 | Flohr et al. |
| 7,513,117 B2 | * | 4/2009 | Garay et al. .............. 60/772 |
| 7,536,252 B1 | | 5/2009 | Hibshman et al. |
| 7,805,922 B2 | * | 10/2010 | Bland .................. F02C 9/26 60/39.281 |
| 8,313,324 B2 | * | 11/2012 | Bulat ................... F02C 7/228 431/12 |
| 2002/0043063 A1 | | 4/2002 | Kataoka et al. |
| 2003/0152880 A1 | | 8/2003 | Eroglu et al. |
| 2006/0040225 A1 | | 2/2006 | Garay et al. |
| 2006/0272331 A1 | | 12/2006 | Bucker et al. |
| 2007/0034171 A1 | * | 2/2007 | Griffin ................. F01K 21/047 122/479.1 |
| 2007/0034704 A1 | * | 2/2007 | Hu ..................... F22B 1/1861 237/12.1 |
| 2008/0010967 A1 | * | 1/2008 | Griffin .................. B01D 53/22 60/39.182 |
| 2008/0060346 A1 | | 3/2008 | Asen et al. |
| 2008/0076080 A1 | * | 3/2008 | Hu et al. ................. 431/9 |
| 2009/0037029 A1 | * | 2/2009 | Garay .................. F02C 9/26 700/287 |
| 2009/0145126 A1 | | 6/2009 | Chillar et al. |
| 2010/0058758 A1 | | 3/2010 | Gilchrist, III et al. |
| 2011/0289898 A1 | | 12/2011 | Hellat et al. |
| 2011/0302922 A1 | | 12/2011 | Li et al. |
| 2011/0314815 A1 | | 12/2011 | Li et al. |
| 2012/0122047 A1 | * | 5/2012 | Cao et al. ................. 432/9 |

FOREIGN PATENT DOCUMENTS

| | | |
|---|---|---|
| EP | 0718470 A2 | 6/1996 |
| EP | 1292795 B1 | 5/2005 |
| EP | 2 246 532 A1 | 11/2010 |
| EP | 2 248 999 A1 | 11/2010 |
| JP | 57-73827 A | 5/1982 |
| JP | 7-34900 A | 2/1995 |
| WO | WO 2004/109075 A1 | 12/2004 |
| WO | WO 2005/064232 A1 | 7/2005 |
| WO | WO 2010/072710 A2 | 7/2010 |
| WO | WO 2010/072729 A2 | 7/2010 |

OTHER PUBLICATIONS

European Search Report (PCT/ISA/201) issued on Apr. 4, 2011, by European Patent Office as the International Searching Authority for Application No. CH 19252010.

O. Bolland et al., New Concepts for Natural Gas Fired Power Plants which Simplify the Recovery of Carbon Dioxide, Energy Convers. Mgmt vol. 33, No. 5-8, pp. 467-475, 1992.

European Search Report (PCT/ISA201) issued Feb. 11, 2011, by European Patent Office and the International Searching Authority for Application No. CH 8412010.

Dieter Winkler et al., Improvement of Gas Turbine Combustion Reactivity under Flue Gas Recirculation Condition with In-Situ Hydrogen Addition, GT2009-59182, Proceedings of ASME Turbo Expo 2009: Power for Land, Sea and Air, Jun. 8-12, 2009, Orlando, Florida, USA, pp. 1-9.

Andre Burdet et al., Combustion under Flue Gas Recirculation Conditions in a Gas Turbine Lean Premix Burner, GT2010-23396, Proceedings of ASME Turbo Expo 2010: Power for Land, Sea and Air, Jun. 14-18, 2010, Glasgow, Scotland, UK, pp. 1-9.

* cited by examiner

COMBINED CYCLE POWER PLANT WITH FLUE GAS RECIRCULATION

RELATED APPLICATION(S)

This application claims priority under 35 U.S.C. §119 to Swiss Patent Application Nos. 00841/10 filed in Switzerland on May 26, 2010 and 01925/10 filed in Switzerland on Nov. 17, 2010, the entire content of which are hereby incorporated by reference in its entirety.

FIELD

The disclosure relates to power plants, such as a method for operating a combined cycle power plant with flue gas recirculation as well as to a plant to carry out such a method.

BACKGROUND INFORMATION

In recent years it has become obvious that the generation of greenhouse gases leads to global warming and that further increase in greenhouse gas production will accelerate global warming. CO2 (carbon dioxide) is identified as a main greenhouse gas and NOx is believed to significantly contribute to the greenhouse effect as an indirect greenhouse gas by producing ozone in the troposphere. CCS (carbon capture and storage) and reduction of NOx emissions are considered potential major means to reduce and to control global warming.

Reduction of NOx emissions can be achieved either by catalytic cleaning of the flue gases or by reduction of the NOx production during combustion.

There has been a continuous strive for higher hot gas temperatures to increase power plant efficiencies. However, NOx emissions increase with higher combustion temperature. To counter this effect flue gas recirculation has been suggested.

CCS can be defined, for example, as the process of CO2 capture, compression, transport and storage. Capture can be defined, for example, as a process in which CO2 is removed either from the flue gases after combustion of a carbon based fuel or the removal of and processing of carbon before combustion. Regeneration of any absorbents, adsorbents or other means to remove CO2 from a flue gas or fuel gas flow is considered to be part of the capture process.

Backend CO2 capture or post combustion capture is a commercially promising technology for fossil fuelled power plants including CCPP (combined cycle power plants). In post-combustion capture the CO2 is removed from a flue gas. The remaining flue gas is released to the atmosphere and the CO2 is compressed for transportation, and storage. There are several technologies known to remove CO2 from a flue gas such as absorption, adsorption, membrane separation, and cryogenic separation. Power plants with post-combustion capture are the subject of this disclosure.

All known technologies for CO2 capture specify the use of relatively large amounts of energy. Due to the relatively low CO2 concentration of the flue gases of a conventional CCPP, such as 4% for example, the CO2 capture system (also called CO2 capture plant or CO2 capture equipment) for a conventional CCPP can be more costly and energy consuming per kg of captured CO2 than the ones for other types of fossil power plants, such as coal fired plants, which have a relatively higher CO2 concentration.

The CO2 concentration in the CCPP flue gas can depend on the fuel composition, gas turbine type and load and can vary substantially depending on the operating conditions of the gas turbine. This variation in the CO2 concentration can be detrimental to the performance, efficiency, and operatability of the CO2 capture system.

To increase the CO2 concentration in the flue gases of a CCPP two main concepts are known. One concept can involve the recirculation of flue gases as for example described by O. Bolland and S. Sæther in "NEW CONCEPTS FOR NATURAL GAS FIRED POWER PLANTS WHICH SIMPLIFY THE RECOVERY OF CARBON DIOXIDE" (Energy Convers. Mgmt Vol. 33, No. 5-8, pp. 467-475, 1992). Another concept can involve the sequential arrangement of plants, where the flue gas of a first CCPP is cooled down and used as inlet gas for a second CCPP to obtain a flue gas with increased CO2 in the flue gas of the second CCPP. Such an arrangement is for example described in US20080060346. These methods can reduce the total amount of flue gas discharged to ambient surrounding and can increase the CO2 concentration, and thereby reduce the specified flow capacity of an absorber, the power consumption of the capture system, the capital expenditure for the capture system, and increase the CO2 capture system's efficiency. However, flue gas recirculation reduces the oxygen content in the inlet gases of the gas turbine and affects combustion. Besides positive effects on NOx emission the reduced oxygen content can lead to an incomplete unstable combustion and result in high CO emissions, which is highly undesirable.

To improve flame stability different measures to impose a controlled inhomogeneity on the flame are known. These measures can include for example piloting, staging, staged premix injection as described in EP1292795 or feeding individual fuel streams to different burner groups as described in U.S. Pat. No. 7,484,352.

SUMMARY

An exemplary embodiment is directed to method for operating a combined cycle power plant (CCPP) having a gas turbine and a heat recovery steam generator with a flue gas recirculation system. The method comprises controlling an imposed combustion inhomogeneity ratio (ri) as a function of flue gas recirculation rate (rFRG) of flue gases recirculated into a compressor inlet air of the gas turbine by the flue gas recirculation system.

Another exemplary embodiment is directed to a combined cycle power plant (CCPP) designed for operating method for operating a combined cycle power plant (CCPP) having a gas turbine and a heat recovery steam generator with a flue gas recirculation system. The combined cycle power plant (CCPP) comprises gas turbine; a heat recovery steam generator; a steam turbine; a flue gas recirculation line with a recirculation flue gas re-cooler; at least one compressor exit pressure and/or compressor exit temperature measurement device, and at least one oxygen and/or CO2 measurement device between a mixing point of recirculated flue gas and ambient air and the compressor of the gas turbine and/or at least one oxygen and/or CO2 measurement device and/or at least one CO and/or unburned hydrocarbon measurement device downstream of the gas turbine and combustor and fuel distribution system configured for imposing a controlled flame inhomogeneity.

BRIEF DESCRIPTION OF THE DRAWINGS

The disclosure, its nature as well as its advantages, shall be described in more detail below with the aid of the accompanying drawings as follows.

DETAILED DESCRIPTION

Figure 1:
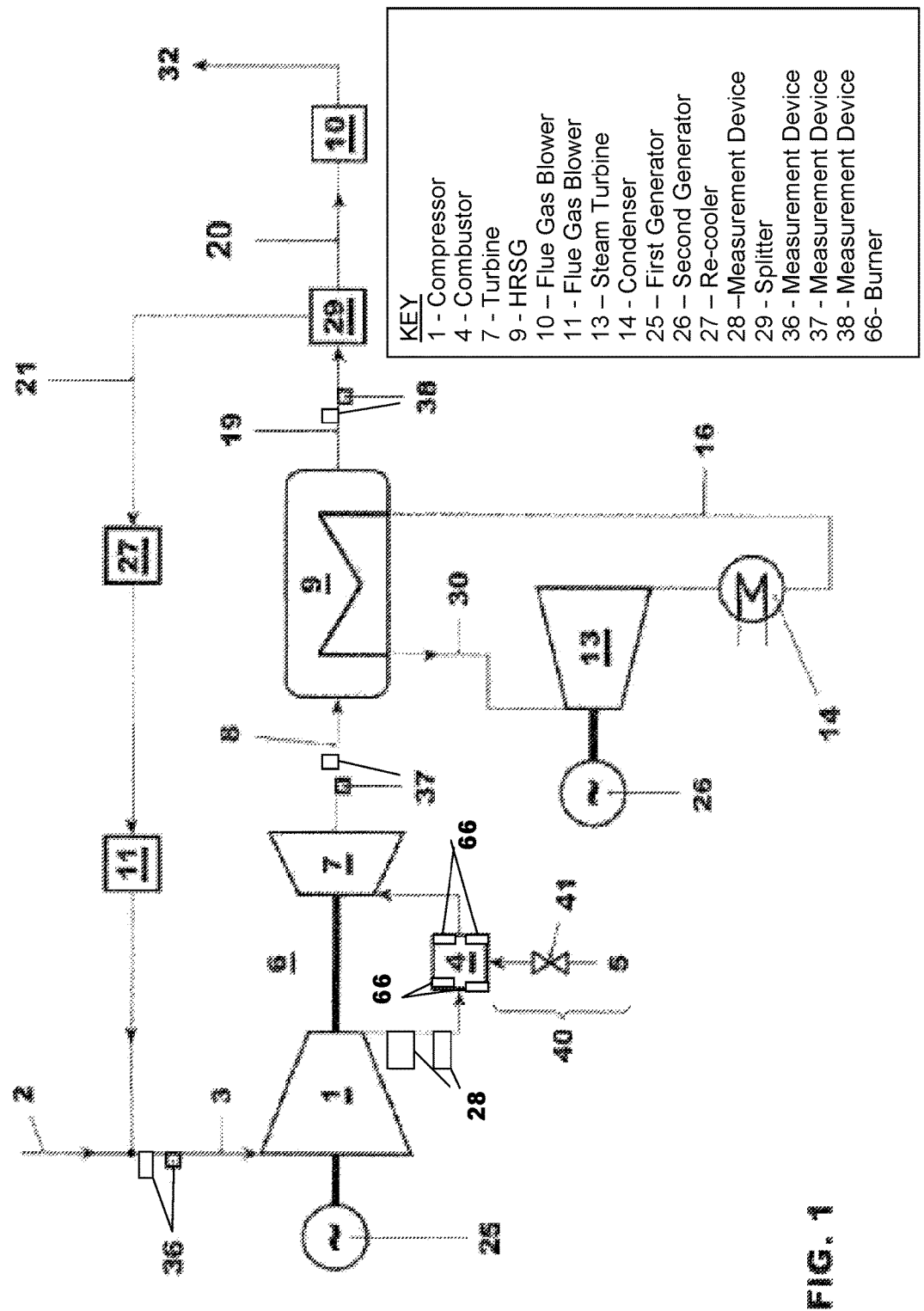
FIG. 1 illustrates a CCPP with flue gas recirculation, and variable speed blowers in accordance with an exemplary embodiment.

Exemplary embodiments of the present disclosure provide a low CO emission and low NOx emission operating method for a combined cycle power plant (CCPP) that includes at least one gas turbine with flue gas recirculation, one heat recovery steam generator (HRSG), and one steam turbine, as well as a plant designed to operate according to an exemplary method.

The exemplary embodiments also allow a high flue gas recirculation rate while maintaining stable, clean combustion and to provide a flexible operation method for flue gas recirculation operation.

Exemplary embodiments of the present disclosure take advantage of the finding that the burn out of CO, such as the reaction of CO with oxygen to form CO2, is facilitated by a high combustion pressure, and the favorable effects of a low oxygen content of the inlet gases of a combustor on the NOx emissions. This allows operation at high flame temperatures with stable combustion and low NOx emissions. To take advantage of these effects an operating method is proposed, in which the flame stability is enhanced by imposing an inhomogeneity on the flame, which is controlled as a function of the flue gas recirculation rate and/or the combustion pressure. The flue gas recirculation rate rFRG can be defined as the ratio of flue gas mass flow from the gas turbine, which is recirculated to the compressor inlet, to the total flue gas mass flow of the gas turbine. The flue gas recirculation rate in combination with the NOx reducing effect of flue gas recirculation enable an exemplary method, which leads to both low NOx and low CO emissions while maintaining a stable flame.

Measures for imposing a controlled inhomogeneity can be for example piloting or staging.

Piloting can include a stabilization of a premixed flame with a diffusion flame, where the pilot ratio is the ratio of fuel gas burned in the pilot flame relative to the total fuel gas mass flow injected into a burners of a combustor.

Staging can include any of two exemplary methods. The first method includes stabilization by staged premixed gas injection into a burner. In this method at least two premixed fuel/oxidizer gas mixtures are injected at different locations into a premix burner and/or premixed fuel/oxidizer gas mixtures with different fuel concentrations are injected into a premix burner. This method and corresponding burners are described in detail in EP1292795 for a conventional gas turbine without flue gas recirculation.

The second method includes stabilization by grouping burners of a combustor into at least two burner groups, which have a common main fuel source. In this method the fuel flow to each burner group is controlled to effectively stage between burners in circumferential direction in an annular combustor, e.g. the burner specific fuel injected to the burners of one group is different from the burner specific fuel injected to the burners of other group. This method and corresponding combustors are described in detail U.S. Pat. No. 7,484,352.

The burner staging ratio can be defined as the ratio of equivalence ratio of fuel air mixture send to one part of the premixed injection locations and the overall equivalence ratio of a burner.

The group-staging ratio can be defined as the ratio of the equivalence ratio achieved in one group of burners to the average equivalence ratio of all burners of a combustor.

Both, the EP1292795 and U.S. Pat. No. 7,484,352 are hereby incorporated by reference in their entirety.

Piloting, staged premixed injection, and staged grouping of burners can be carried out as separate measures or in combination. In the flowing, these and other measures that impose a controlled inhomogeneity on the flame are simply referred to as imposed combustion inhomogeneity. The corresponding pilot ratio or staging ratio or combination of both are referred to as an imposed combustion inhomogeneity ratio.

Another factor influencing the CO and NOx emissions is the combustion temperature or hot gas temperature. In a more refined approach the imposed combustion inhomogeneity ratio can be given as a function of combustion pressure and/or flue gas recirculation rate plus the hot gas temperature.

The compressor exit pressure or another pressure, which is proportional to the combustor pressure, such as for example a suitable cooling air pressure, can be used instead of the combustion pressure. The compressor exit pressure can be used, as it is easy to measure it. Further, the compressor exit temperature is proportional to the pressure ratio and can therefore also be used. When using the compressor exit temperature it should be corrected for ambient temperature.

In an exemplary embodiment a control band, which gives an allowable imposed combustion inhomogeneity ratio as a function of the combustion pressure and/or hot gas temperature is proposed. A target value for the imposed combustion inhomogeneity ratio can be calculated as a function of the combustion pressure and/or hot gas temperature. The actual flue gas recirculation rate can be corrected by a fine control, which adjusts the flue gas recirculation rate depending on the CO emissions. The CO emissions are measured on line for this control method.

In another exemplary embodiment, a two-point control is used to adjust the imposed combustion inhomogeneity ratio as follows: Once the CO emissions increase above a first threshold the imposed combustion inhomogeneity ratio is reduced. Once the CO2 emissions fall below a second threshold value the imposed combustion inhomogeneity ratio is increased. Instead of threshold values a correction function of the imposed combustion inhomogeneity ratio, which is used to calculate the specified correction of the imposed combustion inhomogeneity ratio can also be used. The correction function delivers the offset between the target recirculation rate, which was calculated based on the combustion pressure, and the actual imposed combustion inhomogeneity ratio specified to bring the CO emissions to the desired level. A simple proportional control, which gives an offset proportional to the difference in CO emissions and a target CO emission value, can be used for correction. In a further embodiment the threshold values or correction functions can depend also on the relative load of the CCPP.

In an alternative embodiment, an imposed combustion inhomogeneity ratio as function of the measured unburned hydrocarbon emissions of the flue gases can be used. Here, a two-point control and a correction function of the recirculation rate, which depends on the unburned hydrocarbon emission, can also be used. The correction function delivers the offset between the target recirculation rate, which was calculated based on the combustion pressure, and the actual imposed combustion inhomogeneity ratio specified to bring the unburned hydrocarbon emissions to the desired level. A simple proportional control, which gives an offset proportional to the difference in unburned hydrocarbon emissions and a target unburned hydrocarbon emission value, can be used for correction. In a further embodiment the threshold values or correction functions are depending also on the relative load of the CCPP.

The imposed combustion inhomogeneity ratio can be controlled as a function of NOx emissions.

Further, the actual O2 concentration remaining in the compressor inlet gas can have a significant influence on the combustion process and can be used to adjust the imposed combustion inhomogeneity ratio. Instead of using the O2 concentration in the inlet air as a control parameter, the use of the O2 and/or CO2 concentration in other gas flows, which allow an estimation of the flue gas O2 concentration at the combustor inlet, is feasible. For example use of the CO2 concentration in the turbine's flue gas, can be used. Further, the residual oxygen concentration in the recirculated flue gases or the oxygen concentration in the cooling airflows can be used. Any combination of these concentrations can also be implemented as desired.

The optimum target values for these parameters depend on the specific plant design and are a function of the ambient conditions and the plant load. Their influence on the overall efficiency depends on the plant operating conditions.

The specified O2 concentration can depend on the combustion pressure and temperature. Also the specified O2 concentration can be calculated as a function of the combustion pressure and/or hot gas temperature. Based on the specified O2 concentration the flue gas recirculation rate can be controlled such that the inlet fluid of the gas turbine can be the specified O2 concentration.

At a given combustion inhomogeneity ratio the maximum recirculation rate is often limited by the oxygen concentration specified for stable, complete combustion. Stable complete combustion in this context means, that CO and unburned hydrocarbon emissions (UHC) stay below the specified level set for CO and unburned hydrocarbon emissions, which is in the order of ppm or single digit ppms, and that the combustion pulsations stay within the normal design values. Emission levels can be prescribed by guarantee values. Design values for pulsation depend on the gas turbine, operating point, and combustor design, as well as on the pulsation frequency. In an exemplary embodiment these values should remain well below the combustor pressure, such as 10% below the combuster pressure, and more preferably such as 1 or 2% below the combustor pressure. In another exemplary embodiment, the recirculation rate can be adjusted or fine-tuned depending on the pulsation. For example a target value for the recirculation rate can be calculated based on the compressor exit pressure or the compressor pressure ratio. In some embodiments, the gas turbine can have a design compressor pressure ratio greater than 26. The recirculation rate can be reduced for high combustion pulsations or increased at very low combustion pulsations. These adjustments can be allowed and carried out within a bandwidth around the pressure dependent target value.

In another exemplary embodiment, to increase the operational flexibility and allow a higher recirculation rate at a given imposed combustion inhomogeneity ratio, and to further increase the CO2 concentration in the flue gases at base load and part load, an oxygen enrichment of the compressor inlet gases can be provided. Here oxygen or oxygen enriched air can be admixed to the compressor inlet gases of the gas turbine. In one embodiment the admixture of oxygen is inverse proportional to the compressor exit pressure.

In a first approximation, the capture system's specific energy consumption can be proportional to the CO2 concentration of the flue gases. In this context, capture system specific energy consumption can be defined as the energy needed to remove one mass unit of CO2 from flue gas. Since the CO2 concentration in the flue gases is proportional to the recirculation rate, an optimization target is a high recirculation rate.

The higher recirculation rate not only increases the CO2 concentration but also leads to a reduction in the flue gas mass and volume flow passing through the CO2 capture system. The lower flow also reduces the pressure drop of the system, which is advantageous to the overall performance or allows the use of smaller, less costly equipment. At base load under design conditions, the flue gas recirculation rate is maximized. It is limited by the minimum oxygen concentration specified for the operation of the gas turbine. Recirculation rates can be on the order of 30% to 50% for base load operation.

At part load operation of the gas turbine, the CO2 concentration in conventional gas turbine flue gases can be lower than at base load operation and the oxygen consumption for combustion decreases.

To take into account the differences in CO2 production for different load and operating conditions a target CO2 or target residual oxygen content as a function of the combustion pressure is used in another embodiment.

Flame quenching or partial quenching, which can occur at part load, can also depend on the cooling air mass flows and cooling air temperatures. For most gas turbine designs the cooling air temperatures and mass flows can be a function of the compressor inlet conditions and position of variable inlet guide vanes. Therefore the use of an additional function is proposed, which takes the influence of the inlet conditions and/or position of variable inlet guide vanes on the specified minimum oxygen concentration into account. The imposed combustion inhomogeneity ratio can be corrected accordingly, e.g. the imposed combustion inhomogeneity ratio is reduced for low cooling air temperature when the quenching effect of cooling air on the flame is high and the imposed combustion inhomogeneity ratio is increased for high cooling air temperature when the quenching effect of cooling air is lower.

In exemplary embodiments, any combination of the above described control methods can be implemented as desired. For example, a combustion pressure dependent imposed combustion inhomogeneity ratio, or a combustion pressure dependent function of the target inlet oxygen concentration can be combined with a correction based on measurement of combustion parameters like CO emissions, NOx emissions, and/or unburned hydrocarbon emissions, and/or pulsations.

The flue gas recirculation rate and/or imposed combustion inhomogeneity ratio can be increased to an optimal value in combination with an admixing of oxygen or oxygen enriched gas at which the oxygen concentration is kept to meet the minimum specified level, targeting the optimal plant thermodynamic and economic performances. Admixing of oxygen or oxygen enriched air can be applied as far as justified considering the trade off of ASU (air separation unit) and benefits due to reduced emissions.

In one exemplary embodiment, the admixing of oxygen or oxygen enriched air to the compressor inlet gases is done to control the oxygen concentration at the inlet. The target oxygen concentration at compressor inlet is for example given as a function of combustion pressure and/or imposed combustion inhomogeneity ratio. The oxygen concentration in the inlet air can further be controlled by variation of the flue gas recirculation rate (rFRG) in combination with admixing of oxygen or oxygen enriched air.

In a further exemplary embodiment, the admixing of oxygen or oxygen enriched air to the compressor inlet gases can be carried out as function of CO or unburned hydrocarbons. Once the CO and/or unburned hydrocarbon emissions increase above a first threshold the admixing of oxygen or oxygen enriched air can be increased. Once they are below a second threshold value the admixing is reduced. Instead of threshold values a correction function of the admixing, which depends on the CO and/or unburned hydrocarbon emissions can also be used. In a further embodiment the threshold values or correction functions can also depend on the relative load of the CCPP. This method can further be combined with an adjustment of the flue gas recirculation rate.

Flame or combustor pulsations, which increase if the combustion is incomplete, can also be measured and analogously be used as a control parameter for the admixing of oxygen or oxygen enriched air. In one embodiment a two-point control is used to adjust the imposed combustion inhomogeneity ratio as follows: Once the pulsation level increases above a first threshold the imposed combustion inhomogeneity ratio is increased. Once they are below a second threshold value the imposed combustion inhomogeneity ratio is reduced. Depending on the combustor a specific pulsation frequency band can be used for the pulsation dependent imposed combustion inhomogeneity ratio control. Instead of threshold values a correction function of the recirculation rate, which depends on the pulsation level can also be used. A proportional control, which gives an offset in imposed combustion inhomogeneity ratio proportional to the difference in measured pulsation and a target pulsation value, can be used for correction.

For a control method, which uses the combustor pulsations as a control parameter, at least one corresponding pulsation measurement device can be connected to the combustor.

For a control method, which uses the CO, NOx or unburned hydrocarbons emissions as a control parameter, at least one corresponding measurement device can be installed downstream of the gas turbine.

In a further embodiment, control of the recirculation rate can be combined with a control of the admixture of oxygen or oxygen enriched air. It should be understood that any combination of these control methods can be implemented as desired.

For example, a recirculation rate can be given as a function of pressure to minimize NOx and/or to optimize the flow in the CO2 capture system, and the admixture can be used to control the stable complete combustion. In a second example, the admixture of oxygen or oxygen enriched air is kept at a constant level due to the size of the ASU and the recirculation rate is used to control the stable complete combustion.

In a further embodiment, control of the recirculation rate can be combined with a control of the imposed combustion inhomogeneity ratio. Different possibilities to combine these control methods are conceivable.

For example a recirculation rate can be given as a function of pressure to minimize NOx and/or to optimize the flow in the CO2 capture system, and the imposed combustion inhomogeneity ratio can be used to control the stable complete combustion. In a second example the imposed combustion inhomogeneity ratio is kept at a constant or predetermined level and the recirculation rate can be used to control the stable complete combustion.

Further, as the flue gas flow gets smaller with reduced load an increase of the recirculation rate combined with lower flue gas mass flow of the gas turbine can lead to a significant drop in the flue gas mass flow leaving the power plant. The flue gas flow, which is sent to the CO2 capture unit, is therefore reduced for operation with CO2 capture. However, depending on the design, an optimum mass flow or flow velocity should be maintained in the CO2 capture system. This optimum flow can limit the recirculation rate. Depending on the design of the CO2 capture system, a reduction in the recirculation rate can therefore be specified at low loads to maintain the optimum flow through the CO2 capture system. Depending on the CO2 capture unit the capture unit's efficiency might almost be independent of the flow without a pronounced maximum efficiency over flow rate. However, they can still be limited (e.g. specified) by a minimum flow below which flow instabilities can occur that can lead to vibrations in the CO2 capture system. In this case the control is simplified to assure the minimum flow.

During base load operation the plant power can drop with increasing gas turbine inlet temperature. The target re-cooling temperature is therefore as low as possible. It is normally limited (e.g. specified) by the capacity of the re-cooler. Only if a large low temperature heat sink is available, e.g. low ambient temperature and/or low temperature cooling water, or if icing danger or other operating parameters of the plant can restrict the operation, the re-cooling temperature can be controlled to a higher target temperature.

At part load, when the total mass flows are reduced, the total recirculation mass flow also decreases, and the re-cooler can have the capacity to cool to a lower temperature than at base load. However, for most plant designs increasing the compressor inlet temperature of the gas turbine can increase the part load efficiency at a certain load set point.

The efficiency of a CCPP can be proportional to load. When operating at a fixed absolute load relative load increases with increasing inlet temperature of the gas turbine. The efficiency benefit due to the increase is higher than the efficiency penalty, which can be caused by an increase of the inlet temperature.

The exit temperature of the re-cooler, which cools the recirculated flue gases, and therefore the re-cooling temperature can be increased at part load to realize the higher gas turbine compressor inlet temperature as long as the compressor inlet temperature stays within the operating limits of the gas turbine. Therefore a load and recirculation rate dependent re-cooling temperature can be provided. Depending on the recirculation rate the re-cooling temperature can be controlled such that after mixture of ambient air with the re-cooled flue gases, the inlet temperature is obtained, which leads to the best efficiency at the current power output.

In case of a plant with CO2 capture, the flue gas temperature to the CO2 capture plant after cooling can be optimized for the CO2 capture system, taking into account the cooler limitations.

The CO2 capture system can consist of more than one capture train. To optimize the part load operation it can be advantageous to shut down at least one capture train. As a result, the optimum recirculation rate can become a function of the active capture trains. The integration of the capture system operation with the CCPP operation can be advantageous for the overall plant efficiency.

In a first control step the number of active capture trains can be adjusted to the plant load. In a second step the recirculation rate can be adjusted to optimize the plant efficiency at the specific load and with the specific number of active capture trains. For this, two alternative optimization strategies can be proposed. Either the recirculation rate is used to control the CO2 concentration in the flue gases at the optimum level for the active trains of the capture system or it is used to keep the flow velocity in the capture trains at the optimum speed.

Besides the method, a plant for operating according to this method is part of the disclosure. A plant designed for optimized operation comprises at least one gas turbine, a flue gas recirculation system with a flue gas duct, which directs a first partial flow of the flow gases to the compressor inlet gas flow, at least one control organ to control the recirculation ratio, a re-cooler with temperature control to cool the recirculation flue gases, at least one combustion pressure measurement, and at least one CO2 and/or oxygen concentration measurement device. Instead of the combustion pressure measurement device a compressor exit pressure measurement device or compressor exit temperature device can be used. The compressor exit temperature can be used for approximation of the compressor exit pressure. For better accuracy this is preferably done in combination with a compressor inlet temperature measurement.

Further, the plant according to the present disclosure includes at least one burner and/or a fuel distribution system, which is configured to impose a flame inhomogeneity.

The burner for imposing a flame inhomogeneity can include a pilot stage, and/or is configured for staged premixed fuel injection.

A burner with pilot stage includes at least one fuel injection point for injection of a portion of the combustor's fuel gas without prior premixing of the fuel with combustion air. In one embodiment a fuel lance is used as pilot stage to inject pilot fuel in a burner. The fuel distribution can be configured such that the split of fuel directed to the premix fuel injection points and to the piloting can be controlled.

A burner configured for staged premixed gas injection comprises at least two injection points for injection of premixed fuel/oxidizer gas mixtures and fuel gas control valves to control the fuel injection into each of said premixed fuel/oxidizer gas mixtures. An injection point is an opening, which allows injection of fuel at a specific location in a burner. An injection point is a simple hole or an orifice, and can also be a row or array of holes or orifices.

A gas turbine with a combustor with staged burner groups includes at least two burner groups, having a main fuel source, a main fuel flow control device for controlling the total fuel flow to the combustor, and at least one burner group fuel flow control device for controlling the fuel flow split to the burner groups.

Pilot stage, staged premixed injection, and staged grouping of burners can be installed as separate features or in combination. In the flowing, these features, equivalent features and combination thereof can be referred to as a combustor for imposing a controlled flame inhomogeneity. In the context of the present disclosure a gas turbine with a combustor for imposing a controlled flame inhomogeneity comprises a fuel distribution system configured to control the fuel supply to the combustor.

A recirculation system includes a flue gas recirculation line or duct, a control organ to control the recirculation rate, and a recirculation flue gas cooler. For recirculation, the flue gas flow can be divided into at least two partial flows downstream of the HRSG. A first partial flow can be returned to the inlet of the gas turbine via a flue gas recirculation line, and a second partial flow can be directed to the stack for release to the environment. In case of CCS the second partial flow is directed to the stack via the CO2 capture system. In the CCS case, a bypass around the CO2 capture system can be provided to increase the operational flexibility. This allows to chose any combination of recirculation rate, of flue gas flow to CO2 capture unit, and direct flue gas flow to the stack.

To control the recirculation rate the exhaust flow and/or recirculation flow can be controlled by at least one control organ. This can for example be a controllable damper or a fixed splitter combined with a control organ in one or both of the flue gas lines downstream of the splitter.

As mentioned above, the first partial flow, which is recirculated, can be further cooled by a re-cooler before mixing with ambient air for reintroduction into the compressor of the gas turbine. In one embodiment the control organ, for example a flap or valve, to control the recirculation rate is installed downstream of this re-cooler to reduce thermal load on this control organ.

In a further embodiment a blower can be installed in the recirculation lines and/or the exhaust gas lines. The blower can reduce equipment size as the allowable pressure drop is increased. Practical equipment sizes can be realized with a reasonable pressure drop over the capture system and recirculation lines. Limitations by the gas turbine and HRSG design can be overcome.

The blowers can be located downstream of the coolers, which reduces the thermal load they have to withstand. Further, they operate under stable flue gas temperature and smaller volume flows compared to a design in which the blowers are located upstream of the coolers.

Further, to minimize the power consumption of the blower, a variable speed control is proposed. Thus, the blower can be used to control the recirculation rate. Variable dampers, flaps or control valves, which inherently cause a pressure drop, can be avoided. Therefore, the system's total pressure drop can be reduced by the use of variable speed blowers. Alternatively, a blower with controllable blade or guide vane angles can be provided. Depending on the design and pressures in the flue gas and recirculation system boosters can be used instead of blowers.

To allow continuous oxygen enrichment of the compressor, inlet gases or combustor inlet gases an embodiment of the plant comprises an air separation unit or a membrane based oxygen enrichment unit to produce the specified oxygen.

For oxygen enrichment of the compressor inlet gases the plant comprises oxygen injection ports in the air intake system of the gas turbine. For oxygen enrichment of the combustor inlet gases or combustion gases the plant comprises oxygen injection ports 68 in the combustor or into the compressor plenum for injection of oxygen or oxygen enriched air flow 69 therein.

The above described gas turbine can be a single combustion gas turbine or a sequential combustion gas turbine as known for example from EP0620363 B1 or EP0718470 A2. To ensure the beneficial effects of high combustion pressure on CO emissions the sequential combustion gas turbine should be designed such that the pressure in the second combustor is above a value, such as 15 bara, for example, at full load operation.

A power plant for execution of the proposed method comprises a conventional CCPP, and equipment for flue gas recirculation.

FIG. 1 illustrates a CCPP with flue gas recirculation, and variable speed blowers in accordance with an exemplary embodiment. A gas turbine 6, which drives a first generator 25, is supplied with compressor inlet gas 3, and fuel 5. The compressor inlet gas 3 is a mixture of ambient air 2, and flue gas, which is recirculated via a flue gas recirculation line. The compressor inlet gas 3 can be compressed in a compressor 1. The compressed gas can be used for combustion of the fuel 5 in a combustor 4, and the pressurized hot gases expand in a turbine 7. Its main outputs are electric power, and hot flue gases 8. The fuel is supplied to the combustor by a fuel distribution system 40. Reference is made in some cases to the injection of gaseous fuel in the exemplary embodiments. It should be understood, however, that liquid fuels can also be introduced into the combustion airflow via the fuel outlet openings.

The gas turbine's hot flue gases 8 pass through a HRSG 9, which generates live steam 30 for a steam turbine 13. The steam turbine 13 either is arranged in a single shaft configuration with the gas turbine 6 and a first generator 25, or is arranged in a multi shaft configuration to drive a second generator 26. The steam leaving the steam turbine 13 is sent to a condenser 14 and returned to the HRSG. The steam cycle is simplified and shown schematically without different steam pressure levels, feed water pumps, etc., as these are not subject of the disclosure.

A first partial flow 21 of the flue gases from the HRSG 19 can be recirculated to the inlet of the compressor 1 of the gas turbine 6 where it is mixed with ambient air 2. The first partial flow 21 can be cooled in the recirculation flue gas cooler 27 before mixing with the ambient air 2

A second partial flow 20 of the flue gases from the HRSG 19 can be directed to the stack 32 by the damper 29. To enhance the flue gas flow and to control the recirculation rate a variable speed flue gas blower 10 to the stack 32 can be installed between the damper 29 and the stack 32. Further, a variable speed flue gas blower for recirculation 11 can be installed downstream of the recirculation flue gas cooler 27 before mixing the recirculated first partial flow 21 of the flue gases with the ambient air 2.

Figure 2:
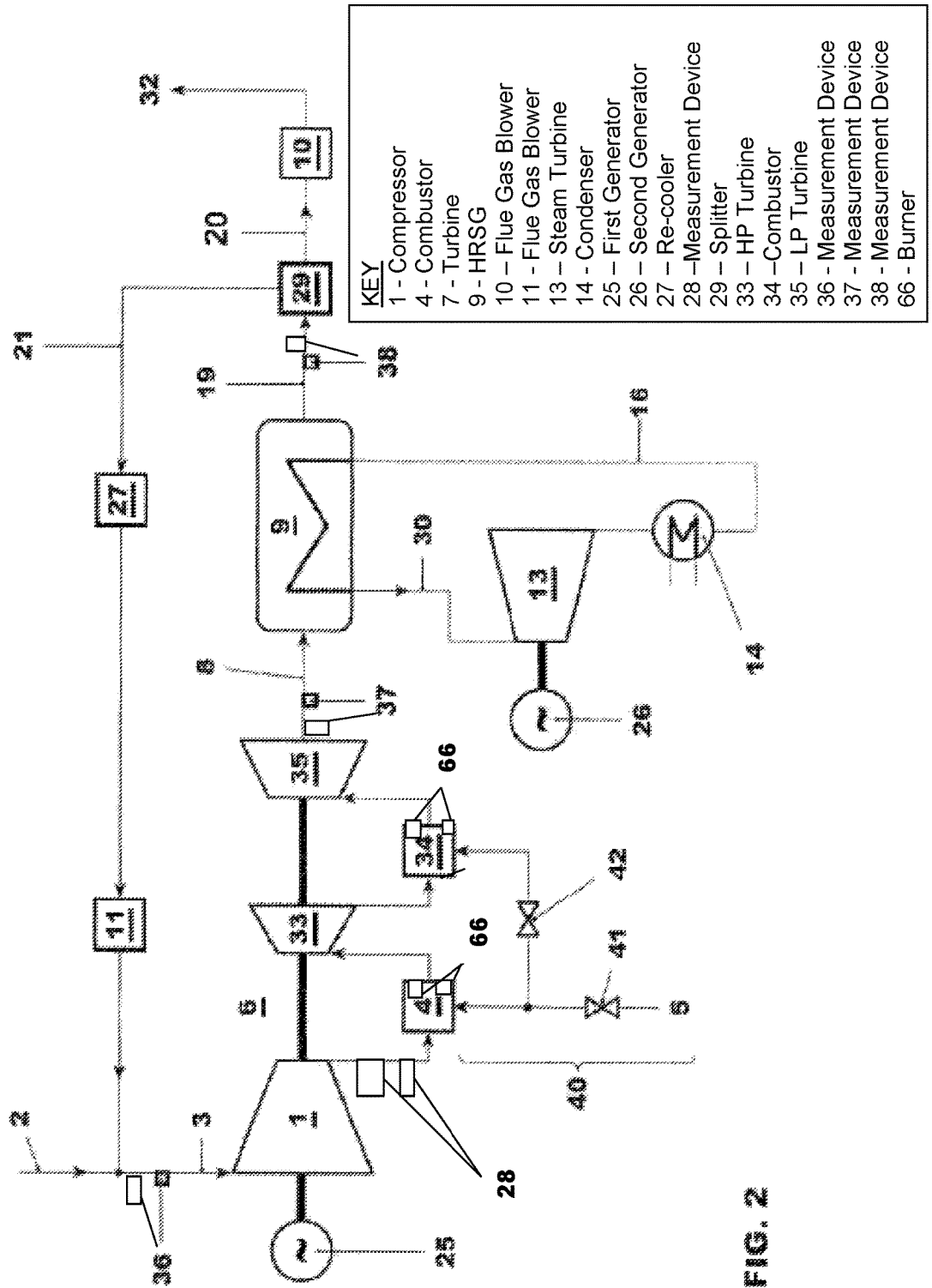
FIG. 2 illustrates a CCPP with a sequential combustion gas turbine, flue gas recirculation, and variable speed blowers in accordance with an exemplary embodiment.

FIG. 2 illustrates a CCPP with a sequential combustion gas turbine, flue gas recirculation, and variable speed blowers in accordance with an exemplary embodiment. Instead of a singe combustor 4 with one turbine 7 the sequential combustion gas turbine can have a combustor 4 followed by a high-pressure turbine 33. The partially expanded gases leaving the high-pressure turbine are reheated in the second combustor 34 before they are further expanded in the low-pressure turbine 35.

Figure 3:
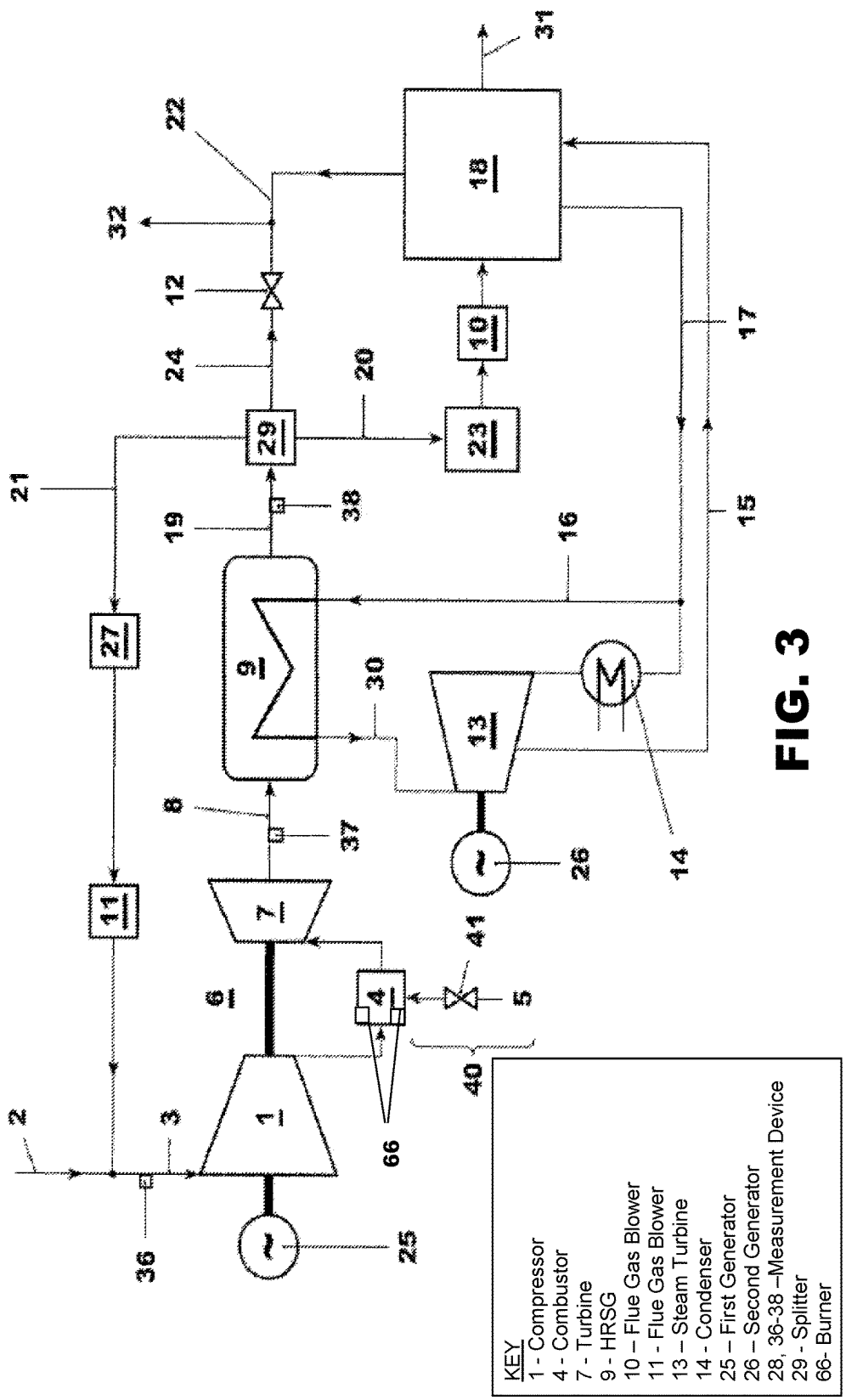
FIG. 3 illustrates a CCPP with backend CO2 absorption including flue gas recirculation, and variable speed blowers in accordance with an exemplary embodiment.

An exemplary arrangement with post combustion capture and flue gas recirculation is shown in FIG. 3. FIG. 3 illustrates a CCPP with backend CO2 absorption including flue gas recirculation, and variable speed blowers in accordance with an exemplary embodiment. In addition to the CCPP shown in FIG. 1 the plant of FIG. 3 comprises a CO2 capture system. The gas turbine's hot flue gases 8 pass through a HRSG 9, which generates live steam 30 for a steam turbine 13. The steam turbine 13 either can be arranged in a single shaft configuration with the gas turbine 6 and a first generator 25, or arranged in a multi shaft configuration to drive a second generator 26. Further, steam can be extracted from the steam turbine 13 and supplied via a steam line 15 to the CO2 capture system 18. The steam can be returned to the steam cycle at reduced temperature or as a condensate via the return line 17 and is reintroduced into the steam cycle. It should be understood that the steam cycle is simplified and shown schematically without different steam pressure levels, feed water pumps, etc., as these are not subject of the disclosure.

A first partial flow 21 of the flue gases from the HRSG 19 can be recirculated to the inlet of the compressor 1 of the gas turbine 6 where it is mixed with ambient air 2. The first partial flow 21 can be cooled in the recirculation flue gas cooler 23 before mixing with the ambient air 2

A second partial flow 20 of the flue gases from the HRSG 19 can be directed to the CO2 capture system 18 by the damper 29. The flue gas cooler 23 upstream of the CO2 capture system 18 cools this second partial flow 20. To enhance the flue gas flow and to control the recirculation rate a variable speed flue gas blower to CO2 capture system 10 can be installed between flue gas cooler 23 and the CO2 capture system 18, and a variable speed flue gas blower for recirculation 11 can be installed downstream of the recirculation flue gas cooler 27 before mixing the recirculated first partial flow 21 of the flue gases with the ambient air 2.

The CO2 depleted flue gas 22 can be released from the CO2 capture system 18 to the environment via a stack 32. In case the CO2 capture system 18 is not operating, it can be bypassed via the flue gas bypass 24.

During normal operation the captured CO2 31 can be compressed in a CO2 compressor and forwarded for storage or further treatment.

In an exemplary embodiment measurement devices to measure the oxygen and/or CO2 concentration can be provided in order to better control the oxygen concentration of the different gas streams.

By controlling the recirculation mass flow, controlling the temperature after recirculation flue gas re-cooler 27, and taking into account the temperature of the ambient air, and the inlet mass flow of the compressor 1, the inlet temperature of the compressor 1 can be controlled.

At base load the re-cooling temperature can be determined by the capacity of the recirculation flue gas re-cooler 27, and depend on the available heat sink. In case of a cooling water cooler with cooling water from a river or the sea, the water temperature can dictate the possible re-cooling temperature. In case of an air cooler, the minimum re-cooling temperature can be above ambient temperature, such as 5 to 10% C above ambient temperature, for example. Depending on the recirculation rate the temperature rise in the compressor inlet temperature is smaller.

If a specific part load power output is specified from the CCPP the turbine inlet temperature or hot gas temperature can be reduced, and the variable inlet guide vanes are closed according to the operating concept until the target power is met. Both lead to a reduction in the plant efficiency, which is proportional to the relative load reduction. By controlling the compressor inlet temperature, the base load power of the plant can be controlled. In particular an increase in the compressor inlet temperature leads to a reduction in the base load power. As a result, the specific power output mentioned above can be reached at base load or at an increased relative power. As long as the efficiency gain due to operation at increased relative load is bigger than the efficiency penalty due to operation at an increased inlet temperature, increasing the compressor inlet temperature can increase the overall efficiency. A plant specific optimum compressor inlet temperature can be determined for every load set point. Based on the optimum compressor inlet temperature, temperature of the ambient air 2, and the load specific gas turbine recirculation rate rGT an optimum re-cooling temperature Trecool can be determined. At base load this is limited by the cooling capacity of the re-cooler. At lower loads the re-cooling temperature Trecool can be raised until the mixture of ambient air and re-cooled flue gases reach the allowable maximum compressor inlet temperature. In this example the maximum allowable compressor inlet temperature is a fixed value. However, since the gas turbine recirculation rate changes over load, the re-cooling temperature Trecool specified to obtain the constant mixing temperature also changes over load.

Depending on the design of the gas turbine 6, the allowable maximum compressor inlet temperature is not constant. This might for example be the case if the compressor end temperature or a cooling air bleed temperature from the mid compressor is the limiting factor. As result a different limiting function for the re-cooling temperature Trecool would be obtained.

In a more refined embodiment the influence of ambient pressure, humidity and inlet/outlet pressure drop can for example also be taken into account to determine the load specific optimum compressor inlet temperature and the corresponding optimum re-cooling temperature.

Figure 4:
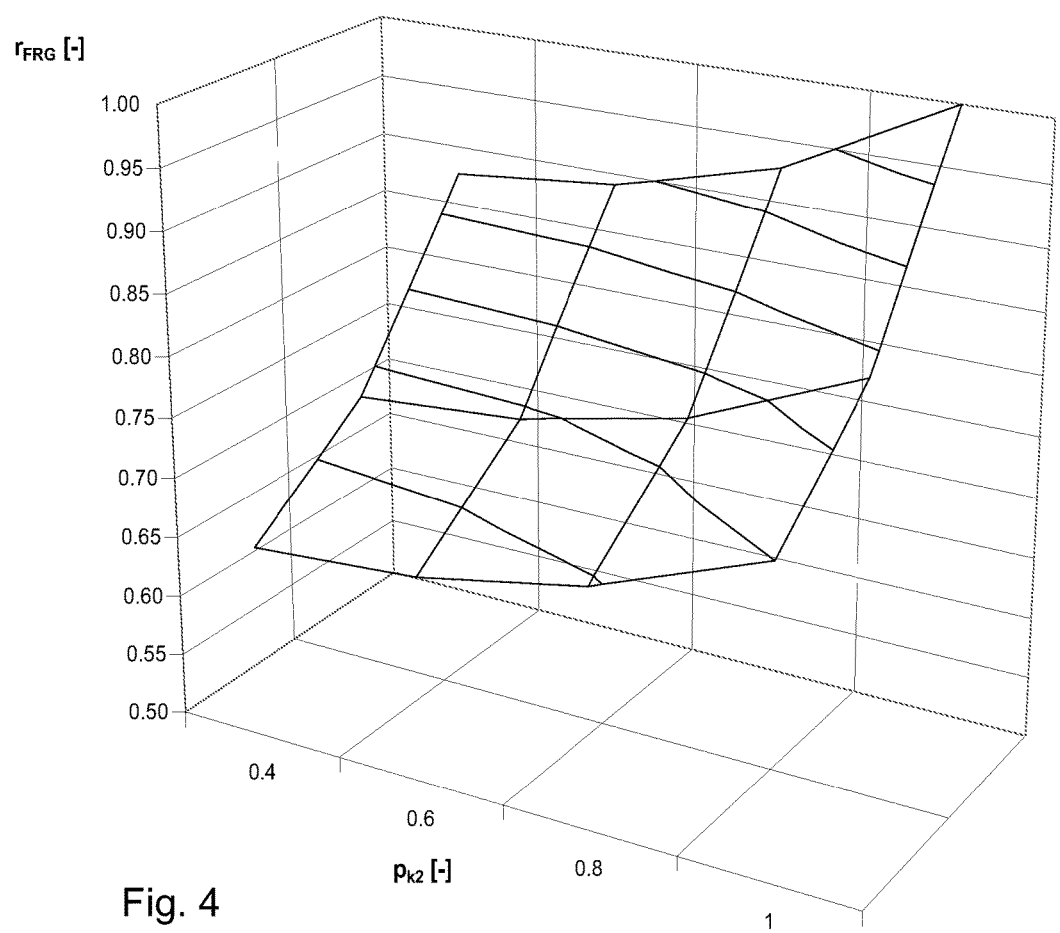
FIG. 4 illustrates an example of the flue gas recirculation rate as a function of the compressor exit pressure and the hot gas temperature in accordance with an exemplary embodiment.

FIG. 4 illustrates an example of the flue gas recirculation rate as a function of the compressor exit pressure and the hot gas temperature in accordance with an exemplary embodiment. FIG. 4 schematically shows an example of the flue gas recirculation rate as a function of the compressor exit pressure and of the hot gas temperature. The compressor exit pressure pk2 can be normalized with the compressor exit pressure at full load under design conditions, the hot gas temperature Thot is normalized with the hot gas temperature at full load under design conditions, and the flue gas recirculation rate rFRG is normalized with the flue gas recirculation rate at full load under design conditions. At full load, the normalized compressor exit pressure pk2, hot gas temperature Tk2 and flue gas recirculation rate rFRG are equal to one. The flue gas recirculation rFRG is reduced for lower compressor exit pressure pk2 and for lower hot gas temperature Thot.

In case of a gas turbine 6 with sequential combustion the flue gas recirculation rate is a function of the hot gas temperatures of the first combustor 4 and the second combustor 34. This leads to an array of curves, which is not shown here. The hot gas temperature Thot of the first combustor can be kept close to constant in a wide load range down to about 50% relative load, e.g. operating load relative to the full load. Therefore this array of curves can be simplified and the hot gas temperature Thot of the second combustor can be used to determine the flue gas recirculation rate rFRG.

The hot gas temperature can be defined as the average hot gas temperature of the hot gases entering a turbine. Instead of the hot gas temperature the so-called TIT turbine inlet temperature, which is a theoretical mixing temperature of the hot gases with the cooling air of the turbine, can be used.

Figure 5:
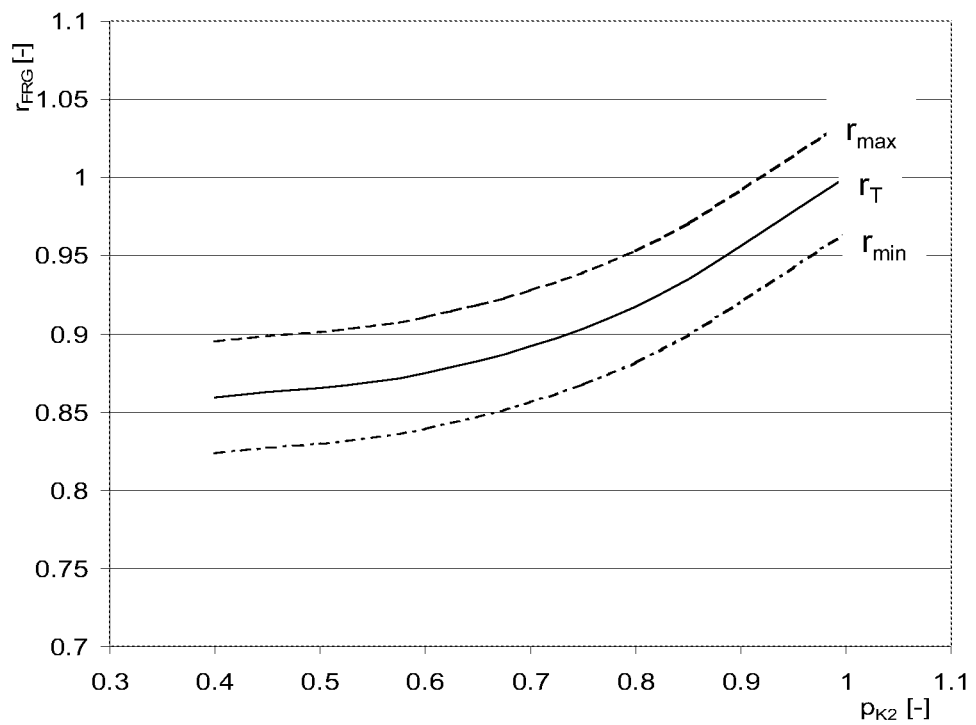
FIG. 5 illustrates an example of the target flue gas recirculation rate as a function OF the compressor exit pressure in accordance with an exemplary embodiment.

FIG. 5 illustrates an example of the target flue gas recirculation rate as a function of the compressor exit pressure in accordance with an exemplary embodiment. In particular, FIG. 5 schematically shows an example of the target flue gas recirculation rate rT as a function the compressor exit pressure pk2 with allowable range for flue gas recirculation rate adjustment for a given hot gas temperature Thot. The compressor exit pressure pk2 is normalized with the compressor exit pressure at full load under design conditions. The flue gas recirculation rate rFRG, as well as the target rT, minimum rmin, and maximum flue gas recirculation rates rmax are normalized with the flue gas recirculation rate rFRG at full load under design conditions. In this example the target flue gas recirculation rate is determined in an open loop control as a function of the compressor exit pressure pk2. The actual flue gas recirculation rate rFRG can be adjusted with a closed loop control within the allowable range between the minimum flue gas recirculation range rmin and maximum flue gas recirculation range rmax given for the respective compressor exit pressure pk2.

For the closed loop adjustment of the flue gas recirculation rate rFRG for example the CO content in the flue gases or the combustor pulsation are used.

The function shown in FIG. 5 is valid for one hot gas temperature Thot. Depending on the operating conditions and design of the gas turbine the influence of the hot gas temperatures can be neglected and this simply a function of the compressor exit pressure pk2 can be used to control the recirculation rate rFRG for all operating conditions without taking into account the hot gas temperature Thot.

Figure 6:
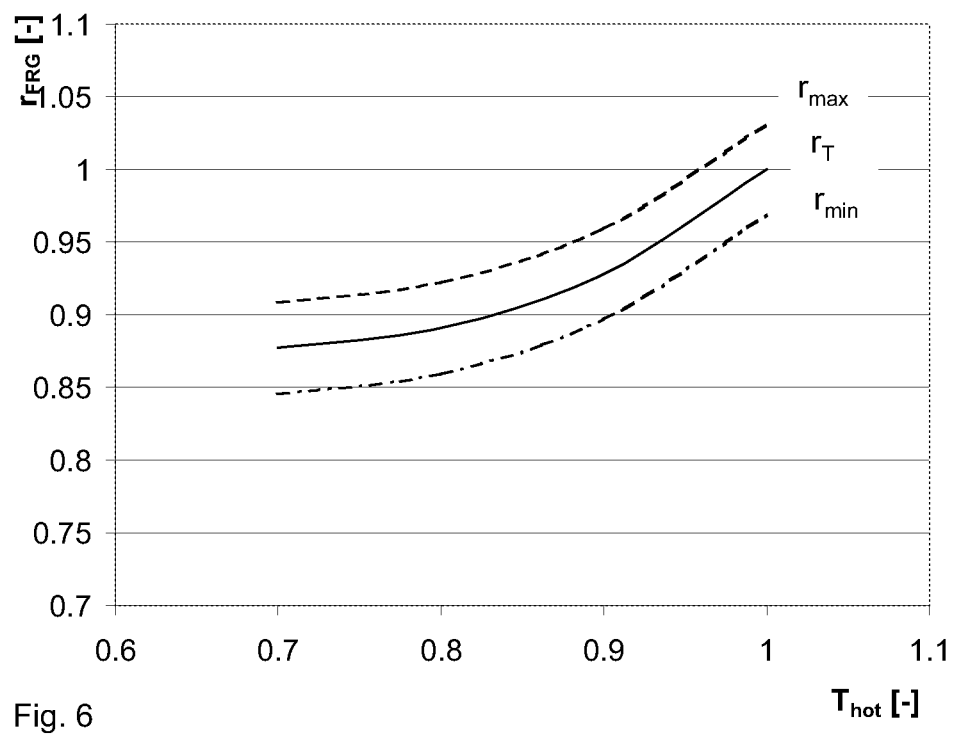
FIG. 6 illustrates an example of the target flue gas recirculation rate as a function of the hot gas temperature in accordance with an exemplary embodiment.

FIG. 6 illustrates an example of the target flue gas recirculation rate as a function of the hot gas temperature in accordance with an exemplary embodiment. FIG. 6 schematically shows an example of the target flue gas recirculation rate as rT a function of the hot gas temperature Thot and the allowable bandwidth for flue gas recirculation rate adjustment for a given compressor exit pressure pk2.

The hot gas temperature Thot can be normalized with the hot gas temperature Thot at full load under design conditions. The flue gas recirculation rate rFRG, as well as the target rT, minimum rmin, and maximum flue gas recirculation rates rmax are normalized with the flue gas recirculation rate rFRG at full load under design conditions. In this example, the target flue gas recirculation rate can be determined in an open loop control as a function of the hot gas temperature Thot. The actual flue gas recirculation rate rFRG can be adjusted with a closed loop control within the allowable range between the minimum flue gas recirculation range rmin and maximum flue gas recirculation range rmax given for the respective hot gas temperature Thot.

As an input variable for the closed loop adjustment of the flue gas recirculation rate rFRG for example the CO content of the flue gases or the combustor pulsation are used as. In one exemplary embodiment the adjustment can be proportional to the deviation of a target value in the CO content of the flue gases and/or the combustor pulsation.

To further enhance the operational flexibility and to overcome the restrictions in recirculation rate at part load and base load an oxygen enrichment of the gas turbine inlet gases is proposed for a further embodiment.

In some combustion system staging of burners in radial direction can be used to improve flame stability and pulsation behavior of the combustion. Staging can increase local hot gas temperatures, resulting in higher NOx. However, in the exemplary operating method of the present disclosure flue gas recirculation reduces the NOx emissions and therefore allows staging in a different operating range. To take advantage of this increased operating window a method in which the staging ratio is a function of the combustion pressure and/or the flue gas recirculation rate can be provided. The staging ratio can for example be defined as the maximum fuel flow to a burner or a group of burners with increased fuel flow divided by the average fuel flow per burner, for example, as a function of the compressor exit pressure pk2 shown in FIG. 5, a control of the burner staging as a function of the compressor exit pressure pk2 can be provided.

As another measure to improve flame stability and pulsation behavior of the combustion piloting with a diffusion flame is known. Piloting can also increase local hot gas temperatures, resulting in higher NOx. However, in an exemplary operating method flue gas recirculation can reduce the NOx emissions and therefore allow piloting in a different operating range. To take advantage of this increased operating window an exemplary method of the present disclosure includes the pilot fuel flow as for example for the flue gas recirculation rate is proposed. Analogue to the flue gas recirculation ratio, which is shown function of the compressor exit pressure pk2 FIG. 5, a control of the pilot fuel flow as a function of the compressor exit pressure pk2 can be provided.

Exemplary embodiments described above and in the drawings disclose to a person skilled in the art embodiments, which differ from the exemplary embodiments and which are contained in the scope of the disclosure. For example, a liquid fuel might be burned in the gas turbine instead of the fuel gas 5.

To realize a control method, which uses the CO or unburned hydrocarbons emissions as a control parameter, a CO or unburned hydrocarbons emissions measurement device has to be installed downstream of the gas turbine 6.

It can for example be installed at the location of the gas turbine flue gas CO2 and/or O2 measurement devices 37 or at the location of the HRSG flue gas CO2 and/or O2 measurement devices corresponding measurement device 38. It might also be a combined measurement device.

Figure 7:
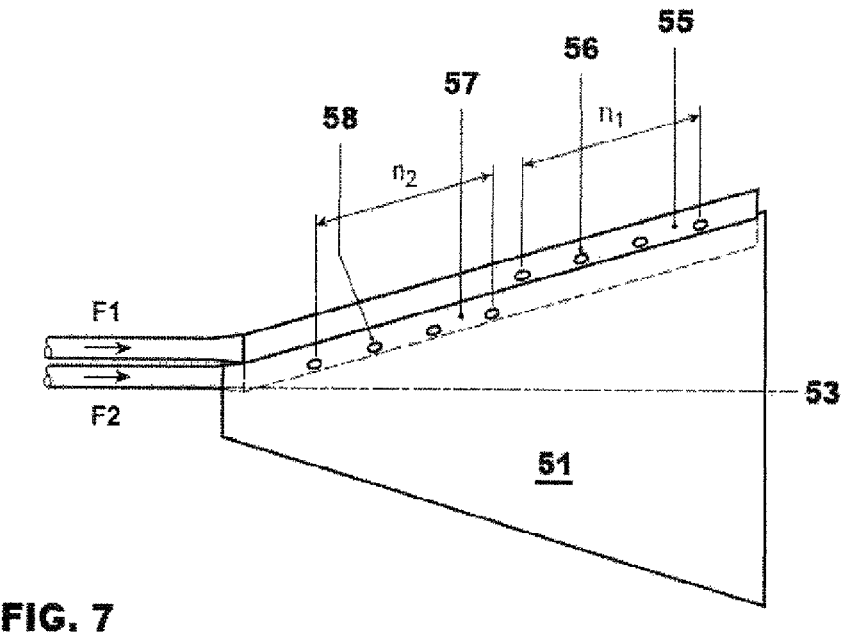
FIG. 7 illustrates an example of a pre-mixed burner with a first group of fuel outlet openings and a second group of fuel outlet openings in accordance with an exemplary embodiment.
Figure 8:
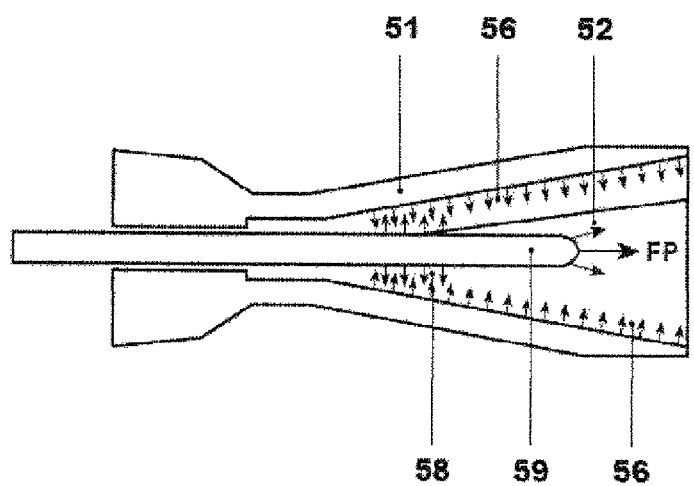
FIG. 8 illustrates an example of a pre-mixed burner with two groups of fuel outlet openings for the introduction of a premix fuel and a feed for pilot fuel in accordance with an exemplary embodiment.

Examples of burners, which can be operated with the method according to the disclosure, are represented in FIG. 7 and FIG. 8. The burners represented comprise a conical swirl body 51, in whose outer shell are arranged, on the inlet flow edges of the air inlet slots, outlet openings 56, 58 for premix gas.

FIG. 7 illustrates an example of a pre-mixed burner with a first group of fuel outlet openings and a second group of fuel outlet openings in accordance with an exemplary embodiment. FIG. 7 shows an arrangement with a first fuel supply conduit 55 and a second fuel supply conduit 57. The second supply conduit 57 for the second premix fuel quantity F2 is arranged adjacent to the first supply conduit 55 for a first premix fuel quantity F1 in the outer shell of this swirl body 51 on the inlet flow edges of the air inlet slots, as they are known to the specialist from the prior art. Premix fuel can be admitted to these two supply conduits independently of one another, i.e. the mass flow of the second premix fuel quantity F2, which flows through the second supply conduit 57, for example, can be set independently of the mass flow of the first premix fuel quantities F1 through the first supply conduit 55. The arrows through the different supply conduits indicate the first and second premix fuel quantities F1, F2. It should be apparent that a plurality of these supply pairs 55, 57 can be arranged symmetrically around the burner longitudinal axis. From the conduits 55, 57 the fuel is injected into the burner via n1 outlet openings in a first group and n2 outlet openings in second group.

A second example of a burner, which can be operated with the method according to the disclosure, is represented in FIG. 8. FIG. 8 illustrates an example of a pre-mixed burner with two groups of fuel outlet openings for the introduction of a premix fuel and a feed for pilot fuel in accordance with an exemplary embodiment. The exemplary burners can comprise the conical swirl body 51, in whose outer shell are arranged, on the inlet flow edges of the air inlet slots, a first group of outlet openings 56 for premix gas. The burners can be equipped with a central fuel lance 59, which can have a nozzle at their combustion-chamber ends, i.e. at their tip—as in the present example—which nozzle can be used for a liquid fuel or for a pilot fuel FP. Outlet openings for shroud air 52 can be provided, in a known manner, around this nozzle. In addition to the fuel supply conduits to the first group of outlet openings 56 and a fuel supply conduit for injecting liquid fuel or for a pilot fuel FP at the tip of the fuel lance 59, the burners represented have a further fuel supply conduit to a second group of outlet openings 58 in the fuel lance 59. The outlet openings 58 of the second group can be arranged in the outer surface of the fuel lance 59 in the direction of the burner longitudinal axis, and are preferably distributed radially symmetrically about the longitudinal axis of the fuel lance 59. The openings 58 permit the injection of fuel from the fuel lance 59 into the swirl space in such a way that it is directed radially outward. The number and size of these outlet openings 58 and their distribution on the fuel lance 59 in the axial direction and peripheral direction is selected as a function of the respective specifications of the burner, such as extinguishing limits, pulsations and flash-back limits.

The fuel lance 59 can extend relatively far into the swirl space or, also, protrude only a short distance into the swirl space. In both cases, the second group of outlet openings 58 is preferably arranged on the fuel lance 59 in the rear region of the swirl space, i.e. in the region furthest removed from the combustor, as is indicated in the figure.

In this embodiment the fuel lance can serve as pilot stage and as an injection point for generation of a premixed fuel.

In these exemplary embodiments also, it is obviously possible to have open-chain or closed-loop control of the fuel supply to the first group of outlet openings 56 independently of the fuel supply to the second group of outlet openings 58.

The embodiment of FIGS. 7 and 8 permit a very advantageous, staged mode of operation of the burner, in which mode both the fuel supply conduits to the first group of outlet openings 56 and the fuel supply conduits to the second group of outlet openings 58 are fed with premix gas. The possibility of independently controlling the fuel supply to the first and second groups of outlet openings 56, 58 permits a mode of operation which is optimally matched to the respective operating conditions of the burner or of the installation utilizing the burner. It is also possible to exclusively supply the first and second groups of outlet openings 56, 58 with fuel, i.e. without supplying the other respective group.

The fuel supply to the two supply ducts can be set, independently of one another, by means of control valves which are not explicitly shown in FIGS. 7 and 8. The arrangement of the fuel control valves is not represented in the Figures. Examples for a suitable fuel gas systems 40 with corresponding fuel control valves are given in FIGS. 9 to 11.

Figure 9:
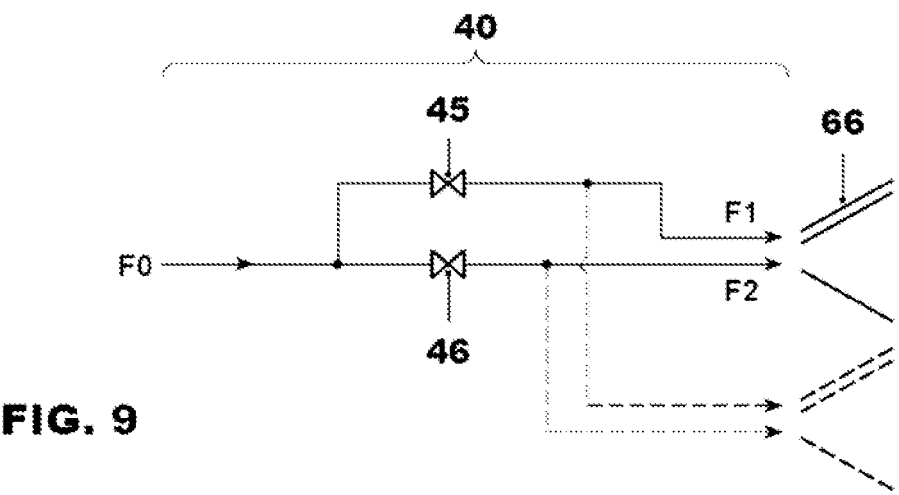
FIGS. 9 and 10 illustrate examples of fuel distribution systems for burners with two groups of fuel outlet openings for the introduction of a first and second premix fuel in accordance with an exemplary embodiment.
Figure 10:
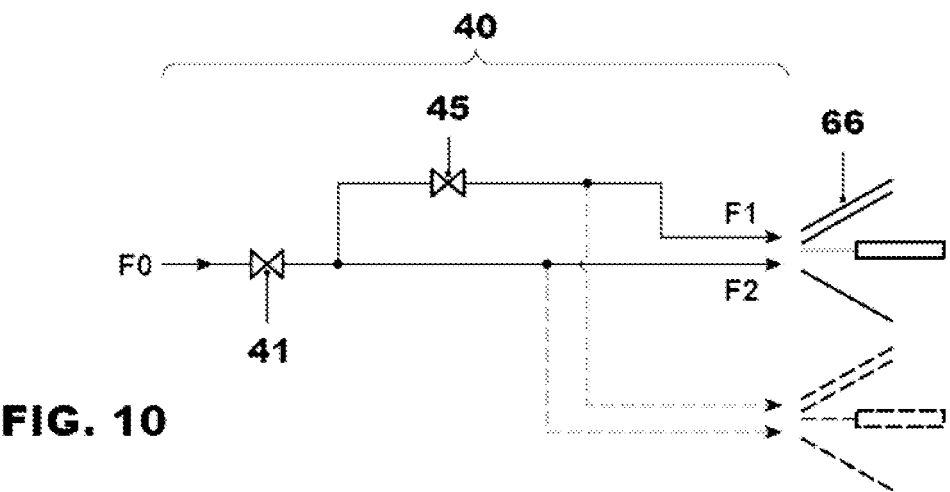
Figure 11:
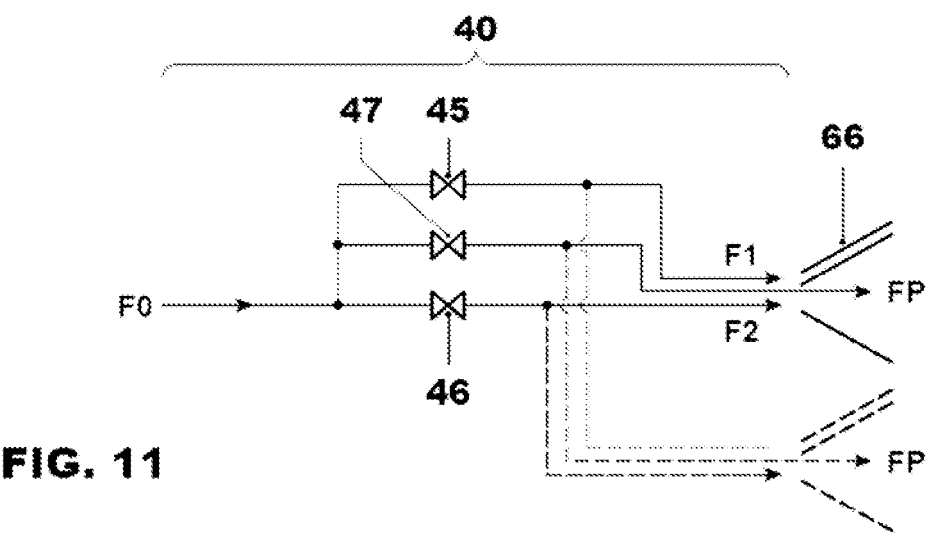
FIG. 11 illustrates an example of a fuel distribution system for burners with two groups of fuel outlet openings for the introduction of a first and second premix fuel and a supply of a pilot fuel in accordance with an exemplary embodiment.

FIGS. 9 to 11 show examples of the fuel distribution system, where a fuel quantity F0 is supplied to the burner. FIGS. 9 and 10 illustrate examples of fuel distribution systems for burners with two groups of fuel outlet openings for the introduction of a first and second premix fuel in accordance with an exemplary embodiment. In the examples of FIGS. 9 and 10 the fuel line branches in order to divide the total fuel quantity F0 between a fuel quantity F1 for the first group of outlet openings 56 and a fuel quantity F2 for the second group of outlet openings 58.

FIG. 9 shows an embodiment in which a control valve 45 can be arranged in the branch for the first group of outlet openings 56 (shown in FIGS. 7 and 8) and in which a control valve 46 can be arranged in the branch for the second group of outlet openings 58.

In this example, the control valves 45 and 46 control the fuel mass flows separately. The total fuel mass flow to the combustor is the sum of both.

FIG. 10 shows an embodiment in which the one control valve 41 can be arranged before the branch for setting the total fuel quantity F0 and control valve 45 is arranged in the branch for the first group of outlet openings 56 (shown in FIGS. 7 and 8). By controlling the control valve 45, it is possible to change the mass flow ratio between F1 and F2. In this example, the control valve 45 can, of course, also be arranged in the branch to the second group of outlet openings 58.

FIG. 11 illustrates an example of a fuel distribution system for burners with two groups of fuel outlet openings for the introduction of a first and second premix fuel and a supply of a pilot fuel in accordance with an exemplary embodiment. FIG. 11 shows an embodiment in which an additional control valve 47 is arranged in an additional branch for controlling a fuel flow to a pilot.

In this example, the control valves 45, 46, and 47 control the fuel flows separately. The total fuel quantity to the combustor is the sum of all three flows.

In all exemplary embodiments, the fuel quantity ratios F1/F0, F2/F0 and FP/F0 can be changed by activating the control valves as a function of the operating condition of the power plant. The change to the quantity ratio can be controlled in an open-chain or closed-loop manner, as a function of different measured operating values, as has already been stated in a previous part of the present disclosure. The designs presented are independent of the burner geometry.

In addition, such an arrangement also permits a plurality of burners to be simultaneously supplied with fuel at the fuel quantity ratio set, as is indicated by the dashed lines in the Figures.

Figure 12:
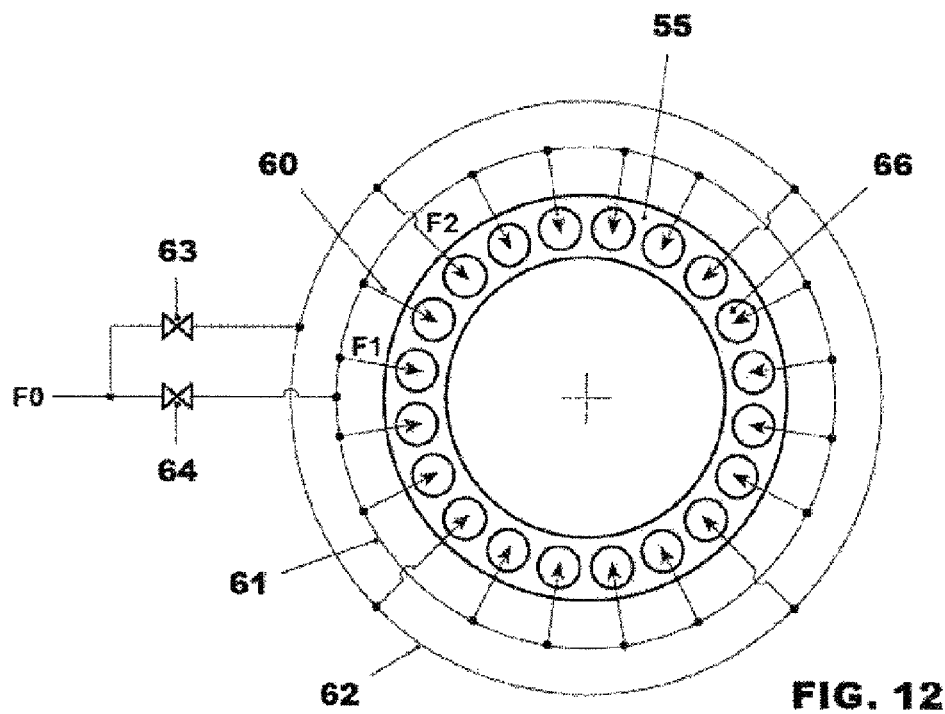
FIG. 12 illustrates an example of a fuel distribution system with two burner groups for staging in an annular combustor in accordance with an exemplary embodiment.
Figure 13:
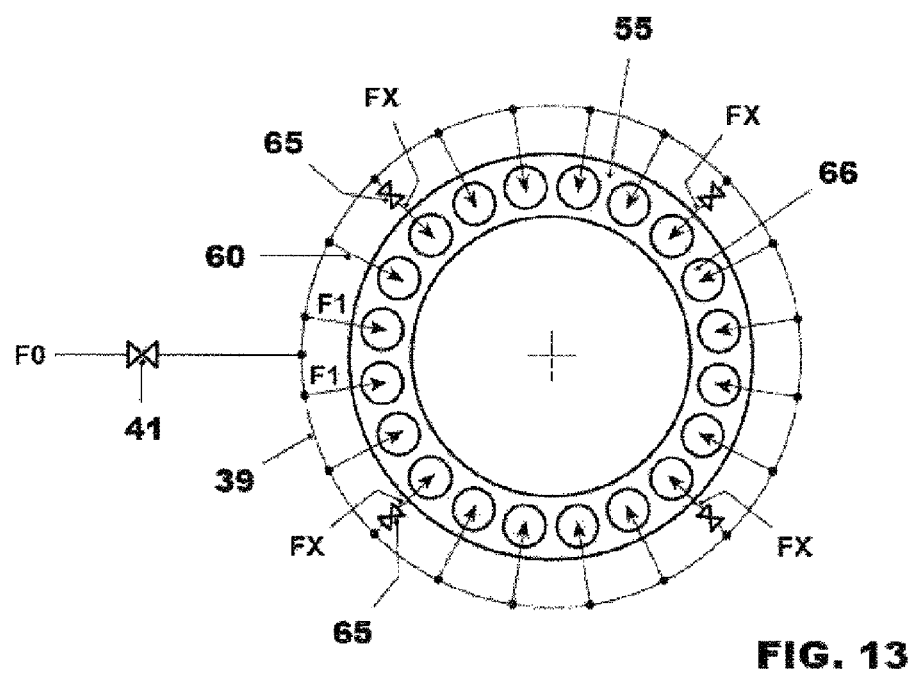
FIG. 13 illustrates an example of a fuel distribution system with one burner group and additional individually controlled fuel gas supply to four burners for staging in an annular combustor in accordance with an exemplary embodiment.
Figure 14:
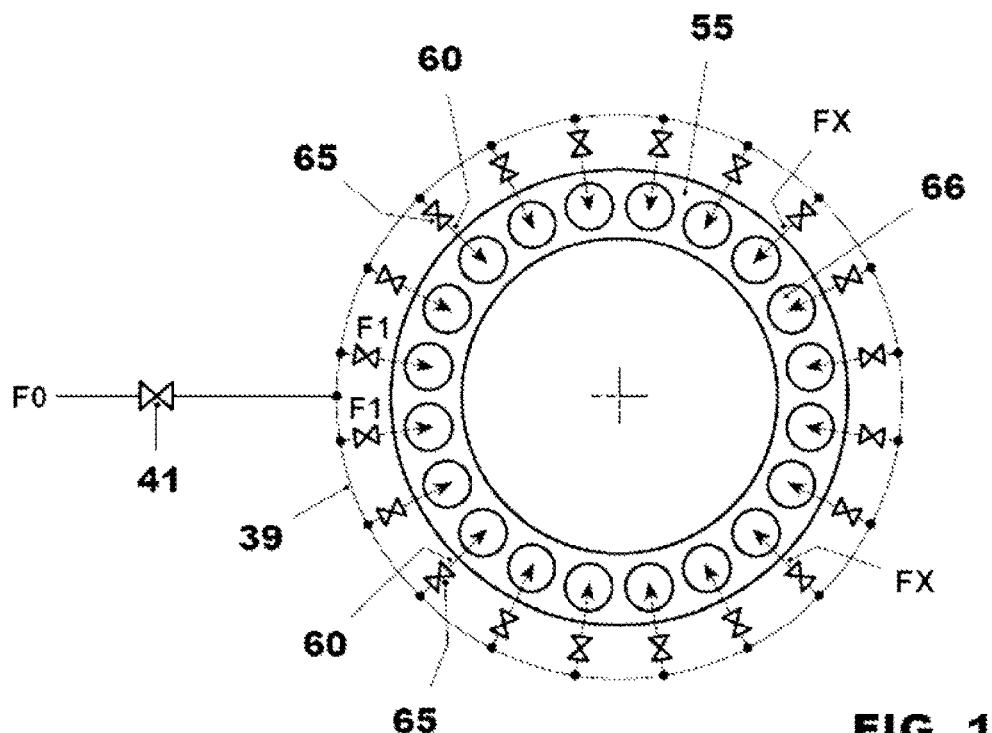
FIG. 14 illustrates an example of a fuel distribution system with a fuel gas control valve for the total fuel mass flow and a burner fuel gas control valve for each burner for staging in an annular combustor in accordance with an exemplary embodiment.

FIGS. 12 to 14 show exemplary cross sections of annular combustors with fuel distribution systems, which are configured to impose a controlled inhomogeneity in circumferential direction of an annular combustor. They show a cross section of an annular combustor 55 with a number of individual burners 66.

FIG. 12 illustrates an example of a fuel distribution system with two burner groups for staging in an annular combustor in accordance with an exemplary embodiment. For example, FIG. 12 schematically shows an example of a fuel distribution system 40 for staging two burner groups in an annular combustor 55. The total fuel quantity F0 is supplied to the burners 66 via the fuel distribution system 40. The fuel distribution system 40 comprises a fuel control valve for the first burner group 63, a fuel control valve for the second burner group 64, a manifold for the first burner group 61 and a manifold for the second burner group 62 and fuel feeds 60 to the individual burners 66. In the shown example the flow to the manifolds for the first and second burner group 61, 62 are controlled by the respective fuel control valves 63, 64. The fuel quantities F1, and F2 are feed to the individual burners of the respective burner groups via the respective manifolds and burner feeds 60.

FIG. 13 illustrates an example of a fuel distribution system with one burner group and additional individually controlled fuel gas supply to four burners for staging in an annular combustor in accordance with an exemplary embodiment. In particular, FIG. 13 schematically shows an example of a fuel distribution system 40 with one burner group. The fuel distribution system 40 comprises a main fuel control valve 41, a manifold 39 and fuel feeds 60 to the individual burners 66.

For staging additional single burner control valves 65 are installed for control of the fuel quantity FX to individual burners 66. Staging can be realized by controlled closing of the single burner control valves 65 in order to reduce the fuel quantity FX, which is feed to individual burners downstream of the respective single burner control valve 65. To all other burners 66 a fuel quantity F1 is feed via the manifold 39, and the fuel feeds 60.

In an alternative embodiment an orifice (not shown) can be installed in part or all of the fuel feeds 60, which are not equipped with a single burner control valve 65. Staging is realized by controlled opening or closing of the single burner control can be 65. In this embodiment an opening of the single burner control valves 65 allows injection of a fuel quantity FX into individual burners downstream of the respective single burner control valve 65, which is greater than the a fuel quantity F1, which is feed via the manifold 39, the orifice, and the fuel feeds 60.

In this context controlled opening or closing includes all valve position between fully open and closed. For example controlled closing includes partial closing of the valve.

FIG. 14 illustrates an example of a fuel distribution system with a fuel gas control valve for the total fuel mass flow and a burner fuel gas control valve for each burner for staging in an annular combustor in accordance with an exemplary embodiment. Here, the fuel distribution system 40 comprises a main fuel control valve 41, a manifold 39, fuel feeds 60 to the individual burners 66, and a single burner control valve in the fuel feed line 60 of each burner 66. This allows a flexible change of staging pattern under all operating conditions.

Figure 15:
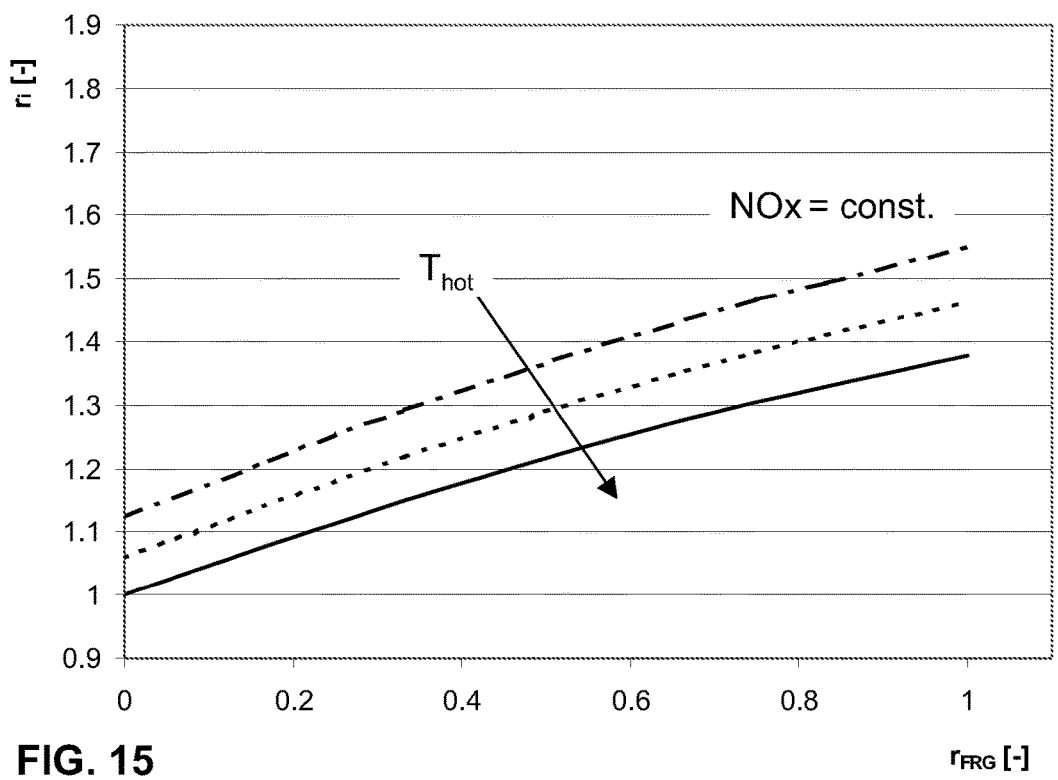
FIG. 15 illustrates an example of the allowable imposed combustion inhomogeneity ratio as a function of the flue gas recirculation rate to limit the NOx emissions to a certain level in accordance with an exemplary embodiment.

FIG. 15 illustrates an example of the allowable imposed combustion inhomogeneity ratio as a function of the flue gas recirculation rate to limit the NOx emissions to a certain level in accordance with an exemplary embodiment. FIG. 15 schematically shows the allowable imposed combustion inhomogeneity ratio ri as a function of the flue gas recirculation rate rFRG which is theoretically needed to keep the NOx emissions to a certain level. It shows three examples for operating curves, which lead to the same level of NOx emissions. Possible limits, like combustor pulsations, combustion instabilities, CO emissions or other restrictions are disregarded. The curves show the dependency of allowable imposed combustion inhomogeneity ratio ri as a function of the flue gas recirculation rate rFRG. With increasing hot gas temperature Thot the allowable imposed combustion inhomogeneity ratio ri to maintain the same level of NOx emissions at a given flue gas recirculation rate rFRG is reduced. The dashed-dotted line corresponds to operation with the lowest hot gas temperature Thot. The solid line corresponds to operation with the highest hot gas temperature Thot.

For a given hot gas temperature Thot the allowable imposed combustion inhomogeneity ratio ri is proportional to the flue gas recirculation ration rFRG, i.e. a higher imposed combustion inhomogeneity ratio ri can be realized with flue gas recirculation for a given NOx emission level. Accordingly the total operating range can be extended by controlling the imposed combustion inhomogeneity ratio ri as a function of the flue gas recirculation rate rFRG.

Figure 16:
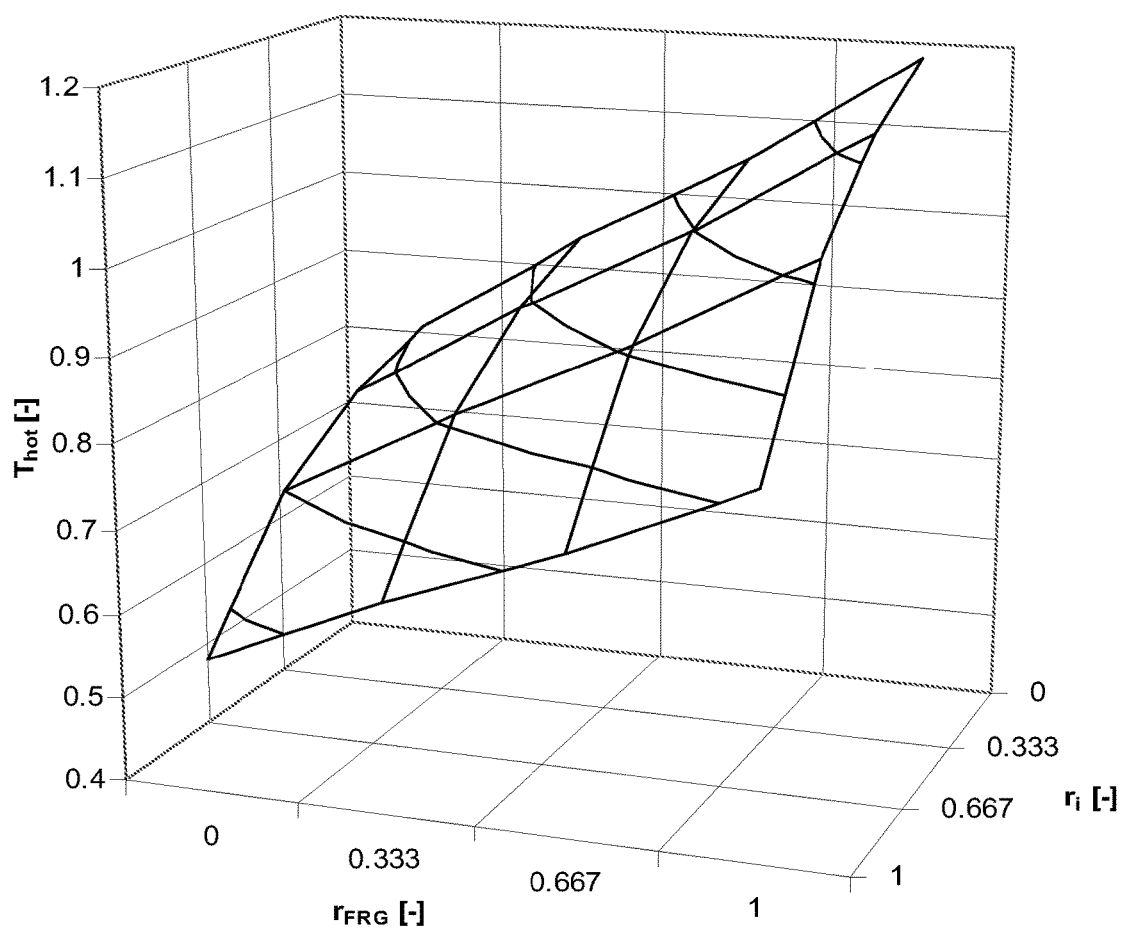
FIG. 16 illustrates an example of the hot gas temperature for operation with constant NOx emissions as a function of the flue gas recirculation rate and the imposed combustion inhomogeneity ratio in accordance with an exemplary embodiment.

FIG. 16 illustrates an example of the hot gas temperature for operation with constant NOx emissions as a function of the flue gas recirculation rate and the imposed combustion inhomogeneity ratio in accordance with an exemplary embodiment. FIG. 16 schematically shows an example of the hot gas temperature Thot for theoretical operation with constant NOx emissions as a function of the flue gas recirculation rate rFRG and the imposed combustion inhomogeneity ratio ri. Possible limits, like combustor pulsations, combustion instabilities, CO emissions or other restrictions are disregarded in the overall function. The hot gas temperature Thot for a given level of NOx emissions is proportional to the flue gas recirculation rate rFRG, and inverse proportional to the imposed combustion inhomogeneity ratio ri. In addition to the function of hot gas temperature Thot for theoretical operation with constant NOx emissions as a function of the flue gas recirculation rate rFRG and the imposed combustion inhomogeneity ratio ri the pulsations limit PL is indicated. An increase in imposed combustion inhomogeneity ratio ri leads to better flame stability, which allows higher flue gas recirculation rate rFRG, and finally leads to a stable operation at increased hot gas temperature Thot. As a result of the increased hot gas temperature Thot the performance, i.e. power and efficiency of the plant can be increased while maintaining the same level of NOx emissions. Alternatively, the NOx emissions can be reduced without performance penalties.

In FIGS. 15 and 16 normalized quantities are used. The hot gas temperature Thot is normalized with the hot gas temperature at full load under design conditions, and the flue gas recirculation rate rFRG is normalized with the flue gas recirculation rate at full load under design conditions. At full load the normalized hot gas temperature Thot and flue gas recirculation rate rFRG are equal to one. The combustion inhomogeneity ratio ri is normalized with a maximum inhomogeneity which can be realized at design conditions with the corresponding hardware, i.e. burner grouping, staging or piloting.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Compressor
2 Ambient air
3 Compressor inlet gas
4 Combustor
5 Fuel gas for GT
6 Gas Turbine GT
7 Turbine
8 Hot flue gas from gas turbine
9 HRSG (heat recovery steam generator)
10 Flue gas blower for second partial flow (to CO2 capture system)
11 Flue gas blower for first partial flow (flue gas recirculation)
12 Bypass flap or valve
13 Steam turbine
14 Condenser
15 Steam extraction for CO2 capture
16 Feed water
17 Condensate return line
18 CO2 capture system
19 Flue gas from HRSG
20 Second partial flow (Flue gas line to CO2 capture system)
21 First partial flow (Flue gas recirculation)
22 CO2 depleted flue gas
23 Flue gas cooler (for second partial flow)
24 Flue gas bypass to stack
25 First generator
26 Second generator
27 Recirculation flue gas re-cooler (for first partial flow)
28 Compressor exit pressure or exit temperature measurement device
29 Flue gas splitter
30 Live steam
31 Captured CO2
32 Stack
33 High pressure turbine
34 Second combustor 35 Low pressure turbine
36 Inlet air CO2 and/or O2 measurement devices
37 Gas turbine flue gas CO2 and/or O2 measurement devices
38 HRSG flue gas CO2 and/or O2 measurement devices
39 Manifold
40 Fuel distribution system
41 Main fuel control valve
45, 46, 47 Control valve
51 Swirl body
52 Shroud air
53 Burner longitudinal axis
55 First supply conduit
56 First group of outlet openings
57 Second supply conduit
58 Second group of outlet openings
59 Fuel lance
60 Fuel feed
61 Manifold for first burner group
62 Manifold for second burner group
63 Fuel control valve for first burner group
64 Fuel control valve for second burner group
65 Single burner control valve
66 Burner
CCPP Combined cycle power plant
F0 Total fuel quantity
F1, F2 Fuel quantity
FP Pilot fuel quantity
n1 Number of outlet openings in first group
n2 Number of outlet openings in second group
pk2 Compressor exit pressure
rFRG flue gas recirculation rate
ri Imposed combustion inhomogeneity ratio
rT Target recirculation rate
rmin Minimum recirculation rate
rmax Maximum recirculation rate
Thot Hot gas temperature

What is claimed is:

1. A method for operating a combined cycle power plant having a gas turbine and a heat recovery steam generator with a flue gas recirculation system, the method comprising:
controlling a combustion inhomogeneity ratio for operational burners receiving fuel to combust the fuel as a function of flue gas recirculation rate of flue gases recirculated into a compressor inlet gas of the gas turbine by the flue gas recirculation system, the combustion inhomogeneity ratio being one of:
(i) a calculated pilot ratio that is a ratio of fuel gas burned in a pilot flame relative to a total fuel gas mass flow injected into an operating burner of a combustor,
(ii) a calculated staging ratio that is one of (a) an equivalence ratio of a fuel gas mixture sent to one part of premixed injection locations and an overall equivalence ratio of an operating burner and (b) an equivalence ratio achieved in one group of operating burners of a combustor to an average equivalence ratio of all operating burners of the combustor, and
(iii) a combination of the calculated pilot ratio and the calculated staging ratio; and
controlling the combustion inhomogeneity ratio as a function of at least one of hot gas temperature of the combustor and a compressor pressure that is proportional to combustion pressure via a control band, the control band defining a maximum flue gas recirculation ratio and a minimum flue gas recirculation ratio to only allow adjustment of flue gas recirculation to the compressor inlet via the flue gas recirculation system such that a rate of flue gas recirculation is set so that the flue gas recirculation ratio is within the control band to impose an allowable inhomogeneity ratio as a function of at least one of the combustion pressure and the hot gas temperature of the combustor, the flue gas recirculation ratio being a ratio between flue gas mass flow from the gas turbine that is recirculated to the compressor inlet and total flue gas mass flow of the gas turbine.

2. The method according to claim 1, comprising:
adjusting the combustion inhomogeneity ratio as a function of measured CO and/or unburned hydrocarbon emissions; and
adjusting an admixing of oxygen or oxygen enriched air with compressor inlet gases as a function of measured CO and/or unburned hydrocarbon emissions; and
adjusting the combustion inhomogeneity ratio as a function of measured combustor pulsations.

3. The method according to claim 1, comprising:
admixing oxygen or oxygen enriched air to at least one of compressor inlet gases of a gas turbine compressor of the gas turbine and to a combustor of the gas turbine to allow a higher flue gas recirculation rate.

4. The method according to claim 1, comprising:
providing a target oxygen concentration in compressor inlet gas with compressor inlet gases as a function of the imposed combustion inhomogeneity ratio; and
controlling oxygen concentration in the inlet gas by at least one of variation of the flue gas recirculation rate and admixing of oxygen or oxygen enriched air.

5. The method according to claim 1, comprising:
adjusting the combustion inhomogeneity ratio and/or adjusting an admixing of oxygen or oxygen enriched air with compressor inlet gases as a function of measured CO and/or unburned hydrocarbon emissions.

6. The method according to claim 1, comprising:
adjusting the combustion inhomogeneity ratio as a function of measured combustor pulsations.

7. The method according to claim 1, comprising:
maintaining the flue gas recirculation rate above a minimum value to assure a minimum flow through a $CO_2$ capture system.

8. The method according to claim 1, comprising:
providing a target compressor inlet temperature of the gas turbine as a function of relative load and in that the compressor inlet temperature is controlled by adjusting a re-cooling temperature.

9. The method of claim 1, wherein the compressor pressure is an exit pressure of the compressor.

10. A combined cycle power plant, comprising:
a gas turbine;
a heat recovery steam generator (HRSG) that receives fluid from the gas turbine;
a steam turbine that receives steam from the HRSG;
a flue gas recirculation line with a recirculation flue gas re-cooler, the flue gas recirculation line connecting a downstream end of the heat recovery steam generator to an inlet of a compressor of the gas turbine;
at least one of:
a measurement device to measure at least one of compressor exit pressure and compressor exit temperature,
at least one measurement device to measure at least one of oxygen and $CO_2$ positioned between a mixing point of recirculated flue gas and ambient air and a compressor of the gas turbine, at least one measurement device to measure at least one of oxygen and $CO_2$ positioned downstream of the gas turbine and combustor, and at least one measurement device to measure at least one of CO and unburned hydrocarbon positioned downstream of the gas turbine and combustor; and a fuel distribution system configured to impose a controlled flame inhomogeneity for operational burners receiving fuel to combust the fuel by controlling fuel distribution as a function of flue gas recirculation rate of flue gases recirculated into the inlet of the compressor of the gas turbine by the flue gas recirculation line based on a combustion inhomogeneity ratio, the combustion inhomogeneity ratio being one of:

(i) a calculated pilot ratio that is a ratio of fuel gas burned in a pilot flame relative to a total fuel gas mass flow injected into a burner of a combustor, (ii) a calculated staging ratio that is one of:
 (a) an equivalence ratio of a fuel gas mixture sent to one part of premixed injection locations and an overall equivalence ratio of a burner and
 (b) an equivalence ratio achieved in one group of burners of a combustor to an average equivalence ratio of all burners of the combustor, and (iii) a combination of the calculated pilot ratio and the calculated staging ratio, the combustion inhomogeneity ratio being controlled as a function of at least one of hot gas temperature of the combustor and a compressor pressure via a control band that is defined to impose an allowable inhomogeneity ratio as a function of at least one of the combustion pressure and the hot gas temperature of the combustor, the control band configured to define a maximum flue gas recirculation ratio and a minimum flue gas recirculation ratio to limit adjustment of flue gas recirculation to the inlet of the compressor via the flue gas recirculation line such that a rate of flue gas recirculation is set so that the flue gas recirculation ratio is within the control band to impose an allowable inhomogeneity ratio as a function of at least one of the combustion pressure and the hot gas temperature of the combustor, the flue gas recirculation ratio being a ratio between flue gas mass flow from the gas turbine that is recirculated to the compressor inlet and total flue gas mass flow of the gas turbine.

11. The combined cycle power plant according to claim 10, wherein the gas turbine comprises at least one of:
a pilot stage in at least one burner, and
at least one burner with staged premixed gas injection.

12. The combined cycle power plant according to claim 10, wherein the gas turbine comprises:
at least one combustor with staged burner groups.

13. The combined cycle power plant according to claim 10, wherein the gas turbine has a design compressor pressure ratio that is proportional to a temperature of gas exiting the compressor.

14. The combined cycle power plant according to claim 10, wherein the gas turbine is a sequential combustion gas turbine with a design pressure of a second combustor, which is greater than 15 bara.

15. The combined cycle power plant according to claim 10, comprising:
a first variable speed flue gas blower for recirculation of flue gas; and
a second variable speed flue gas blower connected to a $CO_2$ capture system for the flue gases directed to the $CO_2$ capture system.

16. The combined cycle power plant according to claim 10, comprising at least one of:
at least one injection port for injecting oxygen or oxygen enriched air to the compressor inlet gases of the compressor and
at least one injection port for injecting oxygen or oxygen enriched air to the combustor or compressor plenum.

17. A method for operating a combined cycle power plant having a gas turbine and a heat recovery steam generator with a flue gas recirculation system, the method comprising:
controlling a combustion inhomogeneity ratio as a function of flue gas recirculation rate of flue gases recirculated into a compressor inlet gas of the gas turbine by the flue gas recirculation system, the combustion inhomogeneity ratio being one of:
(i) a calculated pilot ratio that is a ratio of fuel gas burned in a pilot flame relative to a total fuel gas mass flow injected into a burner of a combustor,
(ii) a calculated staging ratio that is one of:
 (a) an equivalence ratio of a fuel gas mixture sent to one part of premixed injection locations and an overall equivalence ratio of a burner and
 (b) an equivalence ratio achieved in one group of burners of a combustor to an average equivalence ratio of all burners of the combustor, and
(iii) a combination of the calculated pilot ratio and the calculated staging ratio; and
adjusting the combustion inhomogeneity ratio as a function of measured CO and/or unburned hydrocarbon emissions; and
adjusting the combustion inhomogeneity ratio as a function of measured combustor pulsations.

18. The method of claim 17, also comprising:
adjusting an admixing of oxygen or oxygen enriched air with compressor inlet gases as a function of measured CO and/or unburned hydrocarbon emissions occurs.

19. The method of claim 17, wherein the combustion inhomogeneity ratio is adjusted such that the combustion inhomogeneity ratio is reduced when CO emissions increase above a first threshold and the combustion inhomogeneity ratio is increased when $CO_2$ emissions fall below a second threshold value.

20. The method of claim 17, comprising adjusting a flue gas recirculation rate so that a flue gas recirculation ratio is within a maximum flue gas recirculation ratio and a minimum flue gas recirculation ratio to facilitate adjusting of the combustion inhomogeneity ratio as a function of at least one of a compressor pressure that is proportional to the combustion pressure and the hot gas temperature of the combustor, the flue gas recirculation ratio being a ratio between flue gas mass flow from the gas turbine that is recirculated to a compressor of the gas turbine and total flue gas mass flow of the gas turbine.

* * * * *